United States Patent
Ito et al.

(10) Patent No.: US 10,240,106 B2
(45) Date of Patent: Mar. 26, 2019

(54) LUBRICANT-HOLDING BASE MATERIAL, METHOD FOR PRODUCING SAME, LUBRICATING MATERIAL, AND METHOD FOR PRODUCING SAME

(71) Applicant: FUJIFILM Corporation, Tokyo (JP)

(72) Inventors: Koju Ito, Minamiashigara (JP); Hiroshi Yabu, Sendai (JP); Jun Kamei, Sendai (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/057,583

(22) Filed: Mar. 1, 2016

(65) Prior Publication Data
US 2016/0257903 A1    Sep. 8, 2016

(30) Foreign Application Priority Data
Mar. 2, 2015  (JP) .................... 2015-040586

(51) Int. Cl.
*F16C 33/12*   (2006.01)
*F16C 33/20*   (2006.01)
(Continued)

(52) U.S. Cl.
CPC .......... *C10M 169/041* (2013.01); *B05D 3/12* (2013.01); *B29D 99/0089* (2013.01);
(Continued)

(58) Field of Classification Search
CPC ....... B05D 1/18; C08F 136/06; C10M 107/22
(Continued)

(56) References Cited

U.S. PATENT DOCUMENTS

| | | | |
|---|---|---|---|
| 2006/0097361 A1 | 5/2006 | Tanaka et al. | |
| 2009/0246365 A1* | 10/2009 | Ito | B05D 5/02 |
| | | | 427/197 |
| 2010/0247762 A1 | 9/2010 | Ito et al. | |
| 2013/0296206 A1* | 11/2013 | Bongaerts | B01J 20/24 |
| | | | 508/216 |

FOREIGN PATENT DOCUMENTS

| | | |
|---|---|---|
| JP | 2009-293019 A | 12/2009 |
| JP | 2010-229373 A | 10/2010 |
| WO | WO 2004/048064 A1 | 6/2004 |

OTHER PUBLICATIONS

Jun et al. "Fabrication of underwater biomimetic bubble repellent surfaces on the inner surfaces of tubes", the 75th The Japan Society of Applied Physics Autumn Meeting conference abstract, p. 12-016, Sep. 1, 2014.

(Continued)

*Primary Examiner* — Prem C Singh
*Assistant Examiner* — Francis C Campanell
(74) *Attorney, Agent, or Firm* — Birch, Stewart, Kolasch & Birch, LLP

(57) ABSTRACT

Provided are a lubricating material which is made of a non-fluorine-based compound and thus has a surface that is slippery enough for liquid such as water or oil, a lubricant-holding base material which holds a fluorine-based lubricant and thus can be used as a lubricating material, and methods for producing the same. A slippery film has a holding base and a lubricant. The holding base has pillar structure portions and fluorine-containing portions, and the fluorine-containing portions are provided on outer surfaces of a plurality of pillar portions in the pillar structure portion. The lubricant is a fluorine-based liquid, and the fluorine-containing portion has a C—F bond. The lubricant is loaded into a region surrounded by a plurality of the pillar portions and is held in this region.

13 Claims, 15 Drawing Sheets

(51) Int. Cl.
| | |
|---|---|
| *C10M 169/04* | (2006.01) |
| *B05D 3/12* | (2006.01) |
| *B29D 99/00* | (2010.01) |
| *C10M 107/02* | (2006.01) |
| *C10M 147/02* | (2006.01) |
| *C10M 107/38* | (2006.01) |
| *B05D 5/08* | (2006.01) |
| *B29K 23/00* | (2006.01) |
| *B29K 105/04* | (2006.01) |

(52) U.S. Cl.
CPC ........ *C10M 107/02* (2013.01); *C10M 107/38* (2013.01); *C10M 147/02* (2013.01); *B05D 5/083* (2013.01); *B29K 2023/18* (2013.01); *B29K 2105/045* (2013.01); *B29K 2995/0093* (2013.01); *C10N 2250/141* (2013.01)

(58) Field of Classification Search
USPC ........................................ 508/103, 104, 106
See application file for complete search history.

(56) References Cited

OTHER PUBLICATIONS

Kamei et al. "Fabrication of omniphobic lubricated surfaces based on self-organized honeycomb and pillared films", The Society of Polymer Science conference absract, vol. 63, No. 2, pp. 6869-6870, Sep. 3, 2014.

Presentation entitled "Fabrication of biomimetic bubble repellent surfaces on the inner surfaces of tubes", the 75th The Japan Society of Applied Physics Autumn Meeting on Sep. 17, 2014.

Presentation entitled "Fabrication of omniphobic lubricated surfaces based on self-organized honeycomb and pillared films", the 63th Symposium on Macromolecules on Sep. 24, 2014.

Wong et al. "Bioinspired self-repairing slippery surfaces with pressure-stable omniphobicity", Nature, vol. 477, Sep. 22, 2011, pp. 443-447.

Japanese Notification of Reasons for Refusal dated Jan. 17, 2018 for corresponding Japanese patent application No. 2015-040586, with English translation.

* cited by examiner

LUBRICANT-HOLDING BASE MATERIAL, METHOD FOR PRODUCING SAME, LUBRICATING MATERIAL, AND METHOD FOR PRODUCING SAME

CROSS-REFERENCE TO RELATED APPLICATIONS

The present application claims priority under 35 U.S.C. § 119 to Japanese Patent Application No. 2015-040586, filed on Mar. 2, 2015. Each of the above application(s) is hereby expressly incorporated by reference, in its entirety, into the present application.

STATEMENT REGARDING PRIOR DISCLOSURES BY THE INVENTOR OR A JOINT INVENTOR

The following disclosures are submitted under 35 U.S.C section 102(b)(1)(A):
"Fabrication of underwater biomimetic bubble repellent surfaces on the inner surfaces of tubes" made publicity available on Sep. 1, 2014, published in The 75th The Japan Society of Applied Physics (JSAP) Autumn Meeting conference abstract page 12-016, and "Fabrication of omniphobic lubricated surfaces based on self-organized honeycomb and pillared films" made publicity available on Sep. 3, 2014, published in The Society of Polymer Science conference abstract Vol. 63, No. 2, 2014, pp. 6869-6870. Presentation entitled, "Fabrication of biomimetic bubble repellent surfaces on the inner surfaces of tubes" made at The 75th The Japan Society of Applied Physics (JSAP) Autumn Meeting on Sep. 17, 2014 and presentation entitled, "Fabrication of omniphobic lubricated surfaces based on self-organized honeycomb and pillared films" made at the 63th Symposium on Macromolecules on Sep. 24, 2014.

BACKGROUND OF THE INVENTION

1. Field of the Invention

The present invention relates to a lubricant-holding base material, a method for producing the same, a lubricating material, and a method for producing the same.

2. Description of the Related Art

A material holding a fluorine-based lubricant in recess portions of an uneven structure body in which fine protrusions and recesses are formed on the surface has been proposed (Wong, Tak-Sing, et al. "Bioinspired self-repairing slippery surfaces with pressure-stable omniphobicity.", Nature 477. 7365 (2011), p. 443-447). This material is slippery enough to allow liquid droplets to slip on the surface on which the lubricant is exposed through openings in the fine recess portions, and thus the surface is called a slippery liquid-infused porous surface (SLIPS). This material is a non-woven fabric formed of a fiber formed of a compound including fluorine in the structure.

Meanwhile, as the uneven structure body in which fine protrusions and recesses are formed on the surface, there is a honeycomb-structure film or a pillar-structure film. The honeycomb-structure film refers to a film that is provided with a honeycomb structure by arranging a plurality of pores as fine recess portions on a film surface. In addition, the pillar-structure film refers to a film in which protrusion portions are formed in a fine columnar pillar shape.

The honeycomb-structure film can be produced using a dew condensation method (also referred to as a breath figure method) (for example, refer to JP2009-293019A). The dew condensation method is a method in which a solution including a hydrophobic polymer for forming a honeycomb film as a raw material is cast so as to form a cast film, dew is condensed on this cast film so as to form water droplets, and a solvent and water droplets are evaporated, thereby producing a honeycomb-structure film (for example, refer to JP2009-293019A). According to this dew condensation method, the water droplets act as casting molds for pores, and thus it is possible to obtain a honeycomb-structure film in which a plurality of extremely fine and uniform pores are formed in a state of being regularly arranged.

In addition, the pillar-structure film can be produced using the honeycomb-structure film. As a method for producing the pillar-structure film using the honeycomb-structure film, there is a method in which an adhesive film including an adhesive on the surface is attached to one film surface of a honeycomb-structure film on which pores are formed and the adhesive film is drawn, thereby peeling a portion in the above-described film surface side in which pores are formed off from a portion on the other film surface side. In this method, the portion on the other film surface side becomes the pillar-structure film (for example, refer to JP2009-293019A). In addition, a method for producing a pillar-structure film by irradiating a honeycomb-structure film with ultrasonic waves also has been proposed (for example, WO2004/048064A). According to this method, it is possible to easily produce a pillar-structure film using a honeycomb-structure film.

Furthermore, the honeycomb-structure film can also be formed on a curved surface. For example, as a method for forming a honeycomb-structure film on the outer circumferential surface and the inner circumferential surface of a cylinder, there is a method in which the cylinder is immersed in the above-described solution including a hydrophobic polymer as a raw material, a lubricating gas is supplied to the outer circumference and the hollow portion of the cylinder, and then a dried gas is supplied (for example, refer to JP2010-229373A).

SUMMARY OF THE INVENTION

However, since the material of Wong, Tak-Sing, et al. "Bioinspired self-repairing slippery surfaces with pressure-stable ominphobicity.", Nature 477. 7365 (2011), p. 443-447 is formed of a compound including fluorine in the structure, molding workability is limitative, and the material can be molded only to limited shapes that can be produced using a fiber.

Therefore, an object of the present invention is to provide a lubricating material which is made of a non-fluorine-based compound and thus has a surface that is slippery enough for liquid such as water or oil, a lubricant-holding base material which holds a fluorine-based lubricant and thus can be used as a lubricating material, and a method for producing the lubricating material and the lubricant-holding base material.

In order to solve the above-described problems, the lubricant-holding base material of the present invention includes an uneven structure portion and fluorine-containing portions. The uneven structure portion is formed of a hydrophobic polymer, and, in the uneven structure portion, a plurality of recess portions or a plurality of protrusion portions are regularly arranged, and insides of the recess portions or regions surrounded by a plurality of the protrusion portions adjacent to each other serve as spaces for holding a fluorine-based lubricant. The fluorine-containing portions are provided on inner surfaces of the recess portions or on outer surfaces of the protrusion portions and have a C—F bond.

The uneven structure portion is preferably a pillar structure portion in which a plurality of protrusion portions having a tapering shape and a certain size are formed in an upright shape. A height of the protrusion portion is preferably in a range of 0.1 μm to 20 μm.

The uneven structure portion is preferably a honeycomb structure portion provided with a honeycomb structure by arranging a plurality of the recess portions having a certain size in parallel. A depth of the recess portion is preferably in a range of 0.2 μm to 50 μm, and a diameter of an opening in the recess portion is preferably in a range of 0.2 μm to 50 μm.

The hydrophobic polymer is preferably a polyolefin capable of an ene-thiol reaction with a thiol having a fluorine atom, and the polyolefin is preferably polybutadiene.

The lubricant-holding base material is preferably formed in a film shape.

The lubricating material of the present invention includes the lubricant-holding base material and a fluorine-based lubricant loaded into the insides of the recess portions or the regions surrounded by a plurality of the protrusion portions.

In a method for producing a lubricant-holding base material of the present invention, with respect to an uneven structure body which is formed of a hydrophobic polymer and in which a plurality of recess portions or a plurality of protrusion portions are regularly arranged and insides of the recess portions or regions surrounded by a plurality of the protrusion portions adjacent to each other serve as spaces for holding a fluorine-based liquid lubricant, fluorine-containing portions are formed on inner surfaces of the recess portions or on outer surfaces of the protrusion portions.

The uneven structure body is preferably a pillar structure body in which a plurality of the protrusion portions having a tapering shape and a certain size are formed in an upright shape. The pillar structure body is preferably formed by ultrasonically vibrating a honeycomb structure body provided with a honeycomb structure by arranging a plurality of the recess portions having a certain size in parallel on a surface in liquid so as to peel some portions near the surface off from the honeycomb structure body and leaving a portion of partition walls between the recess portions adjacent to each other in the honeycomb structure body as the protrusion portions.

The uneven structure body is preferably a honeycomb structure body provided with a honeycomb structure by arranging a plurality of the recess portions having a certain size in parallel.

The hydrophobic polymer is preferably a polyolefin capable of an ene-thiol reaction with a thiol having a fluorine atom, and the fluorine-containing portion portions are preferably formed by fluorinating the hydrophobic polymer with the thiol. The polyolefin is preferably polybutadiene.

A method for producing a lubricating material of the present invention includes a fluorine-containing portion-forming step and a loading step. In the fluorine-containing portion-forming step, with respect to an uneven structure body which is formed of a hydrophobic polymer and in which a plurality of recess portions or a plurality of protrusion portions are regularly arranged and insides of the recess portions or regions surrounded by a plurality of the protrusion portions adjacent to each other serve as spaces for holding a fluorine-based liquid lubricant, fluorine-containing portions are formed on inner surfaces of the recess portions or on outer surfaces of the protrusion portions. In the loading step, a fluorine-based lubricant is loaded into the insides of the recess portions or the regions surrounded by a plurality of the protrusion portions.

According to the present invention, a lubricating material which is made of a non-fluorine-based compound and thus has a surface that is slippery enough for liquid such as water or oil and a lubricant-holding base material which holds a fluorine-based lubricant and thus can be used as a lubricating material are obtained.

DESCRIPTION OF THE PREFERRED EMBODIMENTS

First Embodiment

Figure 1:
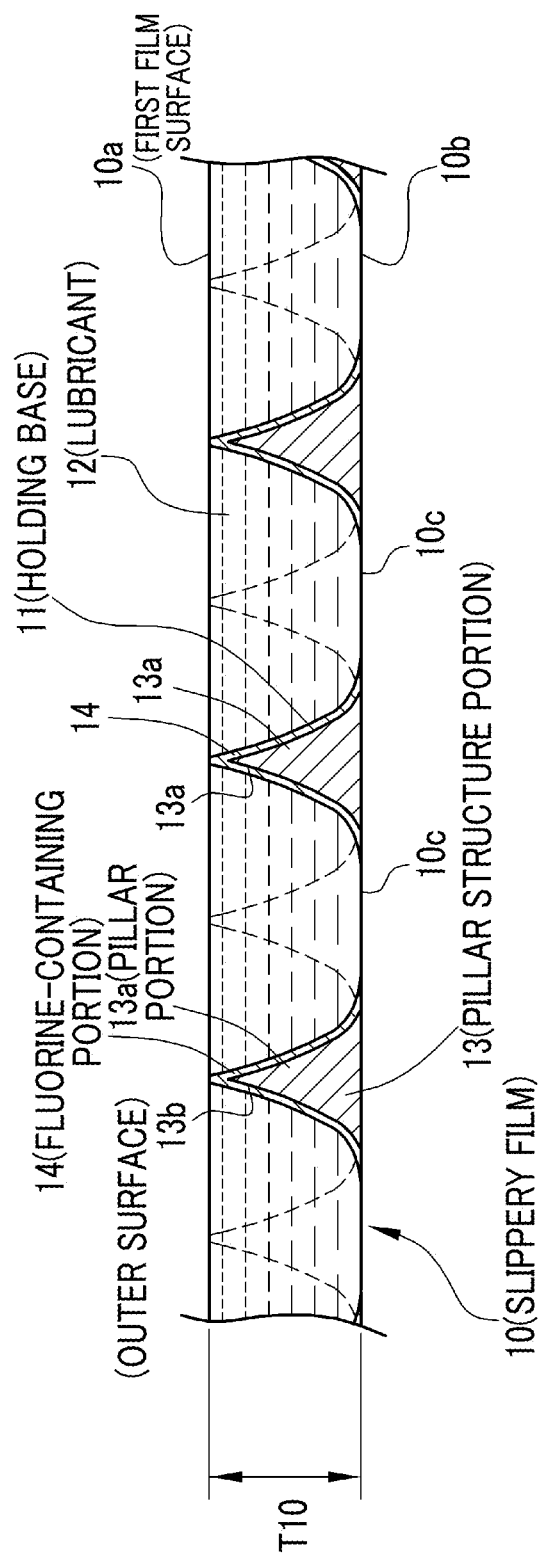
FIG. 1 is a sectional view of a slippery film that is an embodiment of the present invention.

A slippery film 10 illustrated in FIG. 1, which is an embodiment of the present invention, is a slippery material formed in a film shape and exhibits a lubricating property (hereinafter, referred to as the slipping property) which, when liquid or gas comes into contact with a surface, suppresses attachment of the liquid or the gas and allows the liquid or the gas to slip. The slippery film 10 includes a lubricant-holding film base (hereinafter, referred to as the holding base) 11 and a fluorine-based lubricant (hereinafter, referred to as the lubricant) 12. The thickness T10 of the slippery film 10 is set to 10 μm in the present example, but is not limited thereto, and is in a range of 0.2 μm to 100 μm. The slippery film 10 of the present example has a 5 cm×10 cm rectangular shape when seen in a direction perpendicular to one film surface (hereinafter, referred to as the first film surface) 10a, but the size and the shape are not limited thereto. For example, the slippery film can be formed in a round or irregular shape, and, in the case of being produced in a continuous manner as described below, the slippery film can also be formed in a web shape.

The lubricant 12 is provided to develop a slipping property on a first film surface 10a of the slippery film 10. The lubricant 12 is preferably a material which has a structure including a fluorine atom F, maintains a liquid form (a state in which neither a gas phase nor a solid phase appear and a liquid phase is maintained) in a temperature range of −15° C. to 200° C., and is non-volatile and fluid even at a low temperature. In the present example, perfluoroalkylether (Krytox (registered trademark) 103 manufactured by DuPont) is used as the lubricant 12, but the lubricant is not limited thereto, and, as another example, Fluorinert FC-70 (manufactured by 3M) may be used or a mixture of two or more thereof may also be used.

The holding base 11 is provided to hold the lubricant 12. The holding base 11 is made by performing vacuum deposition or an ene-thiol reaction, which will be described below, on a pillar structure film 20 (refer to FIG. 3) described below and, as illustrated in FIGS. 1 and 2, includes pillar structure portions 13 and fluorine-containing portions 14 formed by means of vacuum deposition or an ene-thiol reaction. In FIGS. 1 and 2, the fluorine-containing portion 14 is illustrated in an exaggerated thickness. In addition, in FIGS. 1 and 2, a boundary between the pillar structure portion 13 and the fluorine-containing portion 14 is illustrated, but there is a case in which the boundary is invisible.

A pillar structure portion 13 is an uneven structure portion including a plurality of columnar pillar portions 13a as protrusion portions. A plurality of the pillar portions 13a have almost the same shape and size and are regularly arranged. The respective pillar portions 13a face upwards in FIGS. 1 and 2 and are provided upright in the thickness direction of the slippery film 10. The pillar portion 13a has a so-called tapering shape in which the diameter decreases toward the tip. In this example, the pillar portion 13a is formed to be sharp at the tip, but there is another case in which the tip appears to be round depending on the shape of a pillar 21 (refer to FIG. 3) in the pillar structure film 20 (refer to FIG. 3) described below which serves as a material. On the other film surface (hereinafter, referred to as the second film surface) 10b, a film surface opening portion 10c is formed between the pillar portion 13a and the pillar portion 13a.

The height H13a of the pillar portion 13a (hereinafter, referred to as the pillar portion height) is approximately 3 μm in this example, but is not limited thereto, and is in a range of 0.1 μm to 20 μm. Meanwhile, the pillar portion height is represented by a reference signal H13a in FIG. 2. In this example, since the pillar portions 13a are formed so as to form the film surface opening portions 10c, and the pillar portions 13a are formed on the second film surface 10b, the pillar portion height H13a is equal to the thickness T10 of the slippery film 10. The pillar portion height H13a can be changed by changing the pillar height of the pillar structure film 20 (refer to FIG. 3) described below. In addition, the distance between the pillar portion 13a and the pillar portion 13a which are adjacent to each other (hereinafter, referred to as the distance between the pillar portions) is approximately 8 μm in this example, but is not limited thereto, and is almost constant in a range of 0.2 μm to 50 μm. Meanwhile, the distance between the pillar portions refers to the distance between the tips of the pillar portions 13a adjacent to each other. The distance between the pillar portions changes depending on the distance between adjacent pillars in the pillar structure film 20 which is a material.

Figure 7:
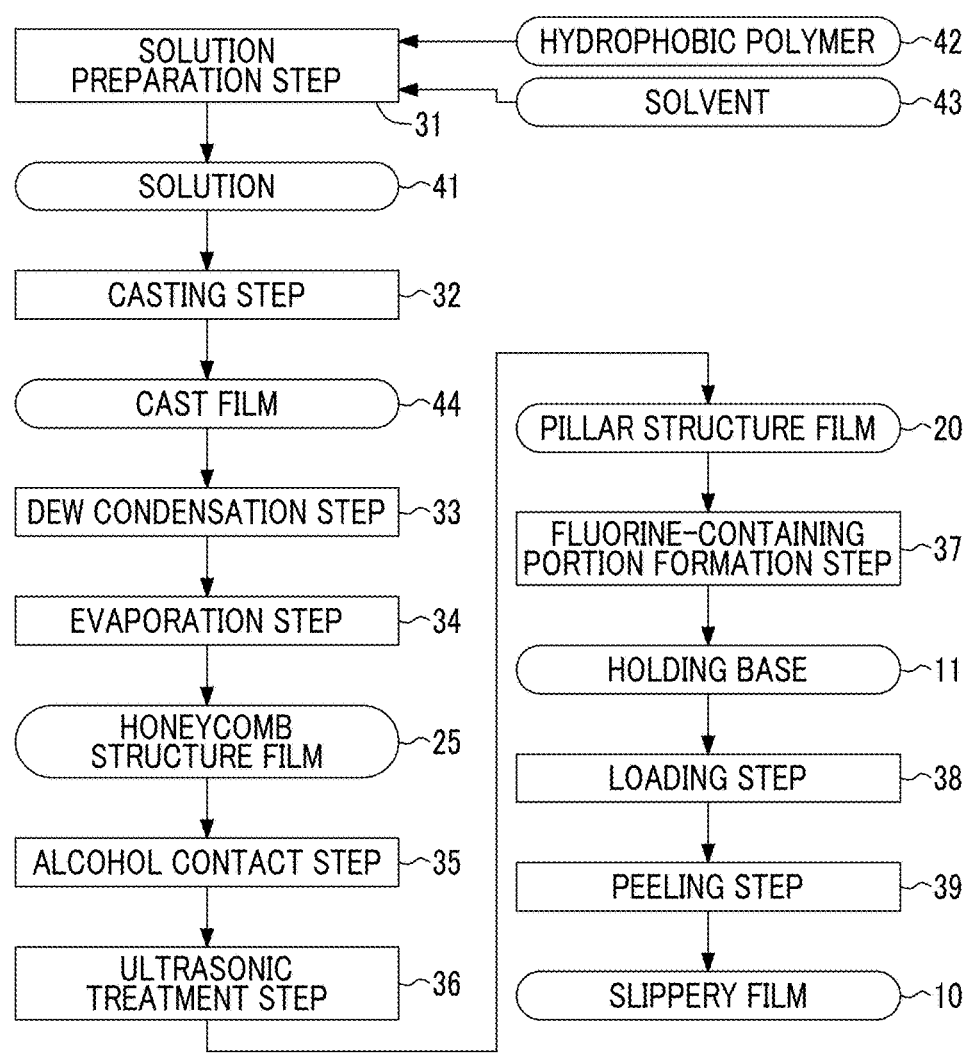
FIG. 7 is an explanatory view illustrating a step of producing the slippery film.

The pillar structure portion 13 is formed of a hydrophobic polymer 42 (refer to FIG. 7). The hydrophobic polymer 42 is preferably polylactic acid, polycaprolactone, polyglycolic acid, polydioxanone, polyhydroxybutyrate, polybutadiene, polyurethane, polystyrene (PS), poly methyl methacrylate, polycarbonate, a copolymer having a repeating unit thereof, or the like. In the present embodiment, polystyrene is used. As described, it is possible to use a polymer not containing fluorine, that is, a hydrophobic polymer not containing fluorine. The pillar structure portion 13 may include, in addition to the hydrophobic polymer 42, for example, an amphipathic compound, and the amphipathic compound may be any one of a polymer, an oligomer, or a monomer. In a case in which the amphipathic compound is included, the mass of the amphipathic compound is preferably 10 parts by mass or lower with respect to 100 parts by mass of the pillar structure film 20.

The fluorine-containing portion 14 is provided on an outer surface 13b of each pillar portion 13a. The thickness of the fluorine-containing portion 14 is 20 nm in the present embodiment, but is not limited thereto, and is in a range of 5 nm to 5 μm. The fluorine-containing portion 14 is constituted with a material having a C—F bond, examples thereof include polytetrafluoroethylene (PTFE), perfluoroalkoxy alkanes (PFA), perfluorooctanethiol (PFOT), or the like, and, in the present embodiment, perfluorooctanethiol is used. A region surrounded by a plurality of the pillar portions 13a including the fluorine-containing portion 14 provided on the outer surface as described above serves as a space for holding the lubricant 12. The lubricant 12 is loaded into the regions surrounded by the pillar portions 13a, and only the tips of the pillar portions 13a are exposed on the first film surface 10a.

When the slippery film 10 is used, the first film surface 10a is disposed on a side on which liquid or gas comes into contact with the slippery film being used. For example, in a case in which the slippery film 10 is used as an antifouling material, the slippery film 10 is disposed so that the second film surface 10b is attached to an article to be protected from a contaminant (for example, a wall surface) and the first film surface 10a is exposed.

The action of the above-described constitution will be described. In the holding base 11, since a plurality of the pillar portions 13a are regularly arranged, and the outer surface 13b of the pillar portion 13 is formed of a material having a C—F bond, the fluorine-based lubricant 12 is held in the regions surrounded by a plurality of the pillar portions. The first film surface 10a is constituted with the tip surfaces of the pillar portions 13a and the lubricant 12, and a majority of the region is constituted with the lubricant 12, and thus the slippery film exhibits a slipping property with respect to liquid or gas in contact with the slippery film. Even when the static contact angle (also simply referred to as the contact angle) of the first film surface 10a with respect to liquid or gas in contact with the slippery film is great, the slipping property with respect to liquid or gas is developed. Therefore, liquid or gas remaining on the first film surface 10a is suppressed.

The above-described slipping property can be evaluated by obtaining a sliding angle (also referred to as a dynamic contact angle). The sliding angle refers to an angle at which a liquid droplet begins to slide and drop when a material, which is an evaluation subject, is positioned so that the surface thereof is horizontally placed, the liquid droplet is dropped on the surface, and the material, which is the evaluation subject, is inclined by gradually lifting one end of the material, and is an angle formed between the surface before being inclined and the surface inclined. The sliding angle on the first film surface 10a of the slippery film 10 is 6.8° for a water droplet and 5.2° for a tetradecane liquid droplet. Tetradecane is used as an example of oil.

In the slippery film 10, the static contact angle of water on the first film surface 10a is in a range of approximately 80° to 130° which is smaller than the contact angle of water on a first film surface 20a of the pillar structure film 20 described below (in a range of approximately 140° to 160°).

In addition, since the fluorine-containing portion 14 is formed on the outer surface 13b of the pillar portion 13a, the lubricant 12 is reliably held for a longer period of time. Therefore, for example, even when the slippery film 10 is used for a long period of time in an environment in which water is present on or passes through the first film surface 10a, a phenomenon in which the lubricant 12 escapes from the regions surrounded by a plurality of the pillar portions 13a and water comes into the regions is suppressed. Therefore, the slipping property is maintained for a long period of time.

Furthermore, the pillar portion height H13a is set to be small in a range of 0.1 μm to 20 μm, and thus the amount of the lubricant 12 required to be held may be small. Since a force holding the lubricant 12 is related to the capillary pressure in the region surrounded by a plurality of the pillar portions 13a as well as the affinity of the fluorine-containing portion 14 to fluorine F and the magnitude relationship of specific gravity between liquid or gas in contact with the first film surface 10a and the lubricant 12, as the amount of the lubricant 12 required to be held decreases, the lubricant is more reliably held or the holding state is maintained for a longer period of time.

In addition, since the holding base 11 can be formed of a variety of hydrophobic polymers as described above, the holding base is produced with the size or shape of the pillar portion 13a, the pillar portion height H13a, the distance between the pillar portions, and the like set in a various manner. Particularly, since the holding base can be formed of a hydrophobic polymer not containing fluorine, the holding base 11 has a high degree of freedom which allows the holding base to be formed from a variety of viewpoints such as the pillar portion 13a and the pillar portion height H13a, and the holding base can be made at low costs.

Figure 3:
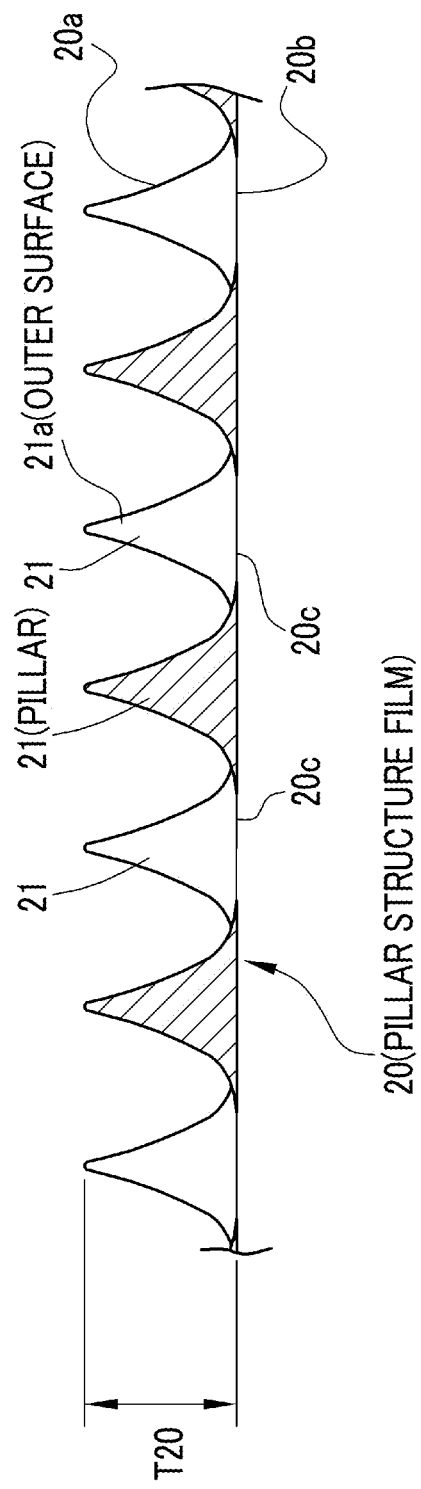
FIG. 3 is a sectional view of a pillar structure film.

The pillar structure film 20, which is a material used to make the holding base 11, is formed in a film shape as illustrated in FIG. 3. The pillar structure film 20 is a pillar structure body as an uneven structure body including a plurality of the pillars 21, which are columnar protrusion portions, on one surface (hereinafter, referred to as the first film surface) 20a. On the other surface (hereinafter, referred to as the second film surface) 20b, a film surface opening portion 20c is formed between the pillar 21 and the pillar 21.

A plurality of the pillars 21 are formed in almost the same shape and size and are regularly arranged on the first film surface 20a. The pillar 21 has a tapering columnar shape. The pillar structure film 20 is produced using a honeycomb structure film 25 (refer to FIGS. 4 to 6) described below. The tip of the pillar 21 has a sharp shape in this example, but the shape changes depending on the thickness of a partition wall 27 (refer to FIGS. 5 and 6) in the honeycomb structure film 25. In addition, the size of the pillar 21 also changes depending on the thickness of the partition wall 27. For example, as the thickness of the partition wall 27 decreases, the shape of the tip of the pillar 21 becomes sharper, and the pillar 21 becomes narrower. On the other hand, when the thickness of the partition wall 27 increases, the shape of the tip of the pillar 21 becomes rounder, and the pillar 21 becomes thicker. Meanwhile, in FIG. 3, the pillar 21 is drawn in a significantly exaggerated thickness with respect to the thickness T20 of the pillar structure film 20.

The height of the pillar 21 (hereinafter, referred to as the pillar height) is approximately 3 μm in this example, but is not limited thereto, and is in a range of 0.1 μm to 20 μm. The pillar height can be changed using the thickness T25 of the honeycomb structure film 25 described below, the aspect of the partition wall 27, and the conditions of an ultrasonic treatment described below. In addition, the distance between the pillar 21 and the pillar 21 which are adjacent to each other (hereinafter, referred to as the inter-pillar distance) is approximately 8 μm in this example, but is not limited thereto, and is almost constant in a range of 0.5 μm to 50 μm. Meanwhile, the inter-pillar distance refers to the distance between the tips of the pillars 21 adjacent to each other. The inter-pillar distance changes depending on the size of a pore 26 in the honeycomb structure film 25. For example, as the pore 26 becomes smaller, the inter-pillar distance becomes shorter.

The pillar structure film 20 is formed of the hydrophobic polymer 42 (refer to FIG. 7). Examples of the hydrophobic polymer 42 are as described above, and, in the present embodiment, polystyrene is used. The pillar structure film 20 may include, in addition to the hydrophobic polymer 42, for example, an amphipathic compound, and the amphipathic compound may be any one of a polymer, an oligomer, and a monomer. In a case in which the amphipathic compound is included, the mass of the amphipathic compound is preferably 10 parts by mass or lower with respect to 100 parts by mass of the pillar structure film 20.

In the pillar structure film 20, the contact angle of water on the first film surface 20a is in a range of approximately 140° to 160° which is greater than the contact angle of water on a first film surface 25a of the honeycomb structure film 25 described below (in a range of approximately 100° to 110°). In addition, in the pillar structure film 20, the contact angle of air (air bubble) on the first film surface 20a is in a range of 150° to 170° in water.

Figure 4:
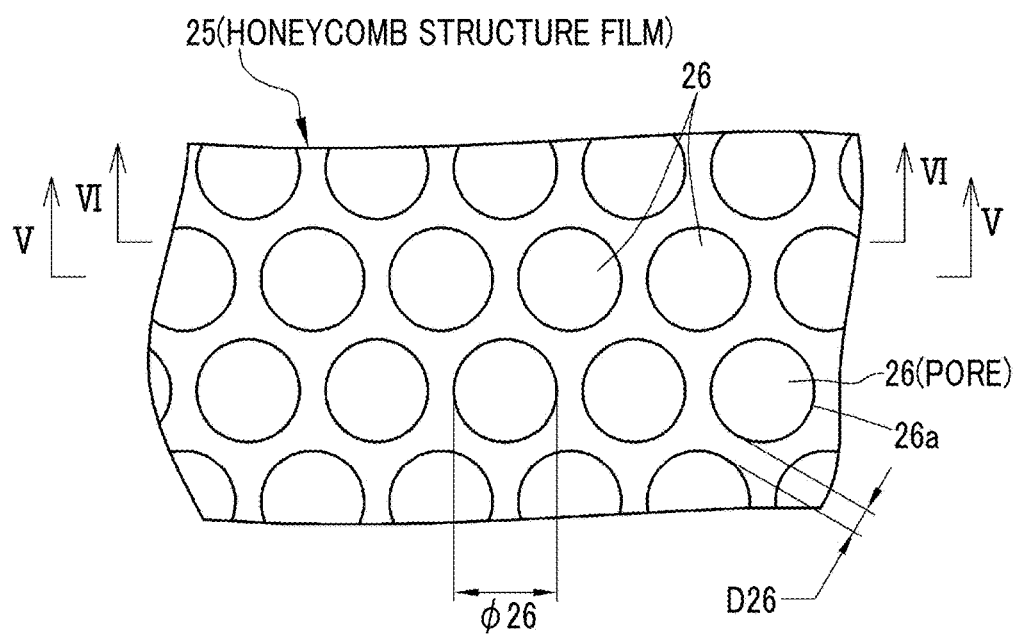
FIG. 4 is a planar view of a honeycomb structure film.
Figure 5:
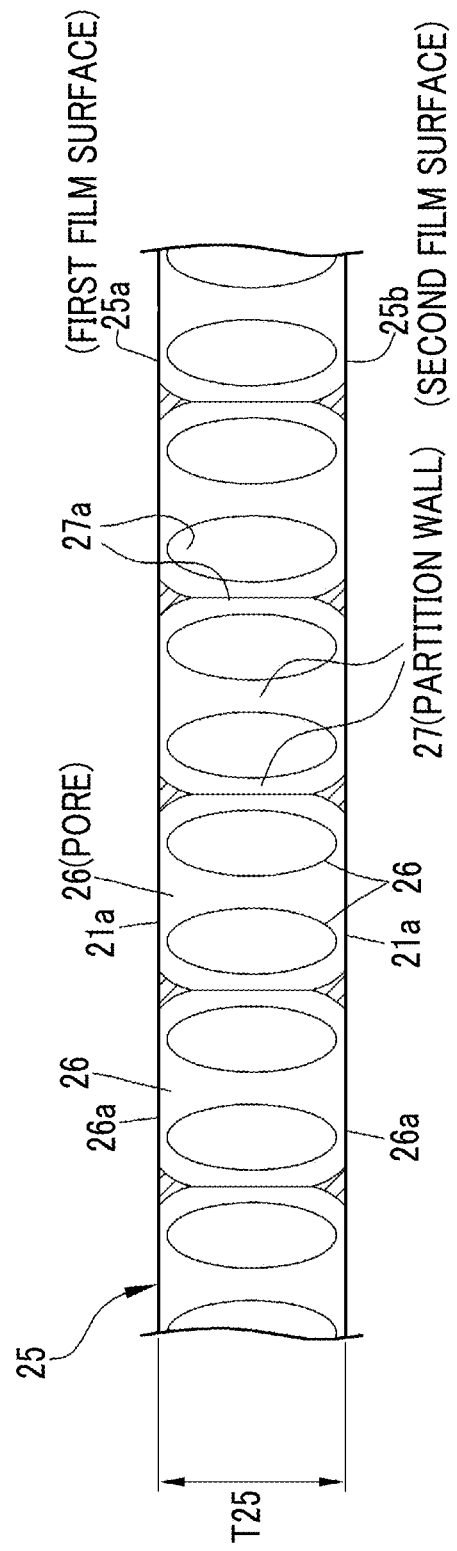
FIG. 5 is a sectional view in a direction of a line V-V in FIG. 4
Figure 6:
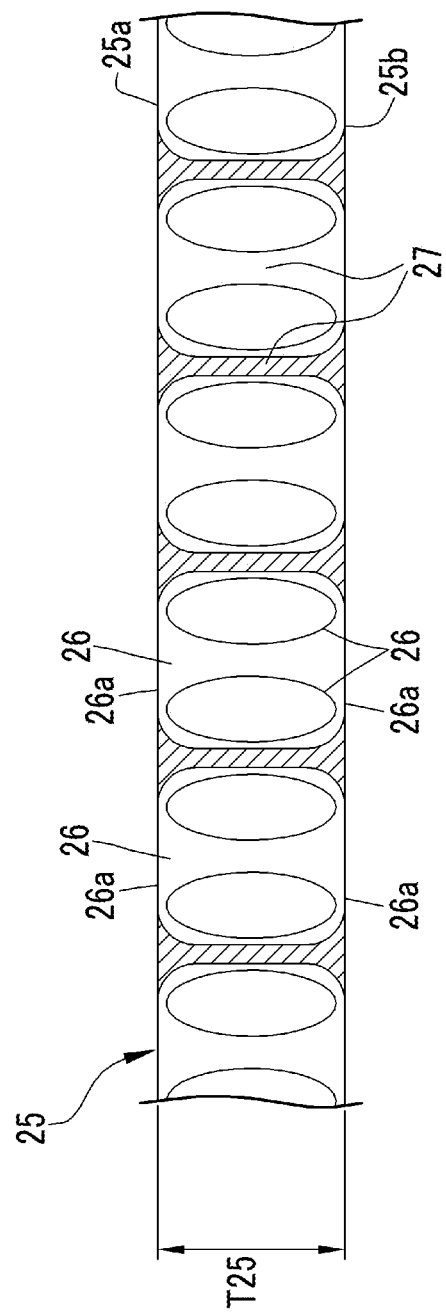
FIG. 6 is a sectional view in a direction of a line VI-VI in FIG. 4

As illustrated in FIGS. 4 to 6, the honeycomb structure film 25, which is a material for the pillar structure film 20, is a honeycomb structure body as a film-shaped uneven structure body and includes a plurality of the pores 26 as recess portions open on one surface (hereinafter, referred to as the first film surface) 25a and the other surface (hereinafter, referred to as the second film surface) 25b. In FIGS. 5 and 6, in the honeycomb structure film 25, the thickness of the partition wall 27 between the pores 26 adjacent to each other is drawn in an exaggerated manner with respect to the thickness T25 of the honeycomb structure film 25.

A plurality of the pores 26 are arranged regularly, more specifically, in a matrix shape, along the first film surface 25a. The pore 26 penetrates the honeycomb structure film 25 in the thickness direction and is open on both the first film surface 25a and the second film surface 25b and thus form a surface opening portion 26a. In addition, as illustrated in FIGS. 5 and 6, the thickness of the partition wall 27 between the pores 26 adjacent to each other decreases toward the center in the thickness direction from the first film surface 25a and the second film surface 25b respectively. In this example, a partition wall opening portion 27a is formed in approximately the center of the partition wall 27 in the thickness direction, and thus the pores 26 adjacent to each other are connected to each other in the honeycomb structure film 25 in a direction along the first film surface 25a.

However, there is another case in which the partition wall opening portion 27a is not formed in the partition wall 27, and, in such a case, the pores 26 are independent of each other. The honeycomb structure film 25 preferably includes the partition wall opening portion 27a in the partition wall 27 rather than not includes the partition wall opening portion 27a in the partition wall 27 from the viewpoint of reliably forming the columnar pillars 21. In addition, in a case in which the partition wall opening portion 27a is not formed in the partition wall 27, the thickness of the partition wall 27 is preferably small from the viewpoint of reliably forming the columnar pillars 21. Each pore 26 has a constant size and a constant shape, and the size and shape of the surface opening portion 26a are also constant. In the above-described honeycomb structure film 25, when seen in a direction perpendicular to the first film surface 25a, the respective pores 26 are densely arranged in a state in which six pores 26 are disposed around an arbitrary pore 26 at six corners of a hexagon. In such a case, the honeycomb structure film 25 forms a honeycomb structure having a honeycomb shape.

In the honeycomb structure, the shape of the surface opening portion 26a or the shape of a section of the pore 26 parallel to the first film surface 25a does not need to be a hexagon. In this example, the shape of the surface opening portion 26a is round. There is another case in which, depending on the density of the pores 26 per unit area of the first film surface 25a, the distance between the pores 26 adjacent to each other, or the like, the shape of the surface opening portion 26a or the pore 26 on a section parallel to the first film surface 25a becomes, for example, a substantial hexagon, a substantial octagon, or the like having round corners, and this aspect is also included in the scope of the honeycomb structure. In addition, the honeycomb structure may have, in addition to a structure in which the respective pores 26 are independent of each other, a structure in which the pores 26 adjacent to each other are connected to each other in the honeycomb structure film 25 as in this example. Furthermore, the arrangement of the pores 26 is not limited to the above-described arrangement. Three to five or seven or more pores 26 may be disposed around an arbitrary pore 26, and the pores 26 may be arranged in a tetragonal manner.

The honeycomb structure film 25 is formed of the hydrophobic polymer 42 (refer to FIG. 7) and may include, in addition to the hydrophobic polymer 42, for example, an amphipathic compound. The amphipathic compound may be any one of a polymer, an oligomer, and a monomer. Preferred examples of the hydrophobic polymer 42 and a preferred mass of the amphipathic compound in a case in which the amphipathic compound is included are the same as the examples and the mass for the pillar structure film 20.

The thickness T25 of the honeycomb structure film 25 is preferably in a range of 0.5 µm to 100 µm. The thickness T25 of the honeycomb structure film 25 is more preferably set to 0.5 µm or greater since the strength of the honeycomb structure film 25 becomes higher compared with that of a honeycomb structure having a thickness of smaller than 0.5 µm and is more preferably set to 100 µm or smaller since the honeycomb structure film 25 can be more easily produced compared with a honeycomb structure film having a thickness of greater than 100 µm.

The open pore diameter of the pore 26 on the first film surface 25a, that is, the diameter φ26 of the surface opening portion 26a, and the interval D26 between the pores 26 may be determined depending on the target distance between protrusions in the pillar structure film 20 to be produced. In a case in which the distance between protrusions in the pillar structure film 20 is in a range of 0.5 µm to 50 µm, the diameter φ26 of the surface opening portion 26a is preferably in a range of 0.3 µm to 45 µm, and the interval D26 between the pores 26 is preferably in a range of 0.5 µm to 50 µm.

Meanwhile, in this example, the honeycomb structure film 25 in which the respective pores 26 penetrate in the thickness direction is used, but the honeycomb structure film may have a structure in which the respective pores 26 do not penetrate the honeycomb structure film in the thickness direction. In the structure in which the pores 26 do not penetrate the honeycomb structure film in the thickness direction, the pores 26 are open only on the first film surface of the honeycomb structure film, and the second film surface becomes a flat surface including no surface opening portions 26a. In a case in which a honeycomb structure film in which the pores 26 are open only on the first film surface as described above is used, the obtained pillar structure film includes the second film surface on which the film surface opening portions 20c are not formed, that is, a flat second film surface.

The slippery film 10 is produced using, for example, a step of producing a slippery film illustrated in FIG. 7. The step of producing a slippery film includes a solution preparation step 31, a casting step 32, a dew condensation step 33, an evaporation step 34, an alcohol contact step 35, an ultrasonic treatment step 36, a fluorine-containing portion formation step 37, a loading step 38, and a peeling step 39.

Figure 8:
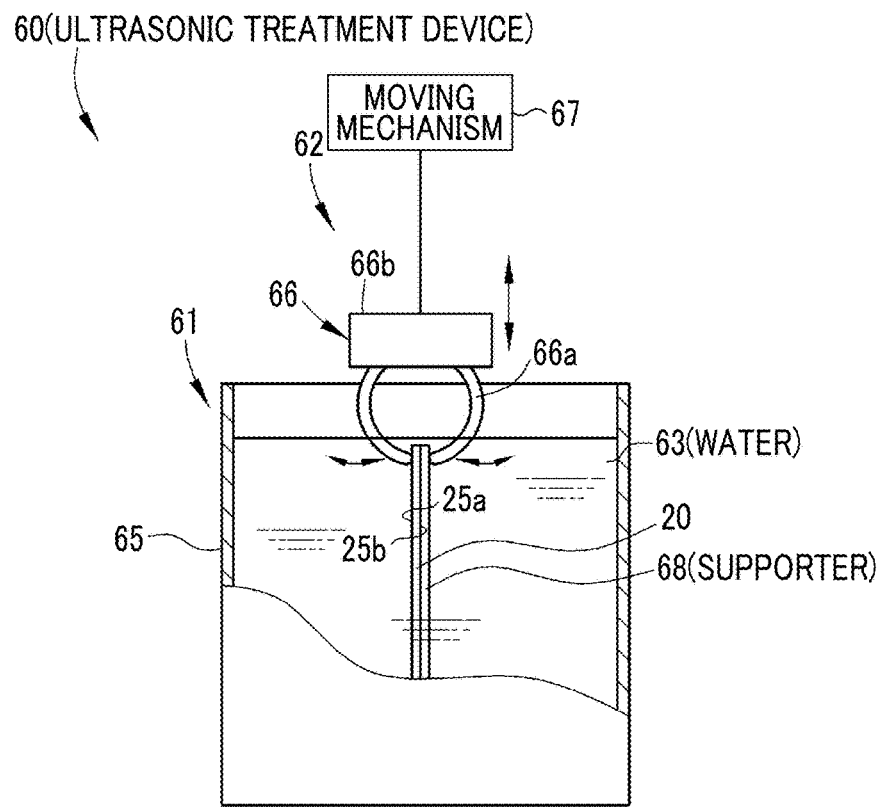
FIG. 8 is an explanatory view illustrating an outline of an ultrasonic treatment device.

The solution preparation step 31 is a step for preparing a solution 41 for forming the honeycomb structure film 25. In this example, the hydrophobic polymer 42 is dissolved in a solvent 43, thereby producing the solution 41. The casting step 32 is a step for forming a cast film 44 by feeding and spreading the solution 41 on a supporter 68 (refer to FIG. 8). It is preferable to adjust the temperature of the supporter 68 to a desired value in advance and during formation of the cast film 44. Meanwhile, in the present embodiment, as the supporter 68, a polyethylene terephthalate (PET) sheet is used. However, a material for the supporter 68 is not limited to PET as long as the material is not dissolved in the solvent 43, and the material is for example, glass, aluminum, or the like. As the shape of the supporter 68, a variety of shapes such as a sheet shape or a plate shape may be employed. In addition, a long cast film 44 may be formed by forming the supporter 68 in a long film shape, moving the long supporter 68 in the longitudinal direction, and continuously feeding the solution 41 on the moving supporter 68. The supporter can be moved in the longitudinal direction by, for example, disposing a plurality of rollers (not illustrated) along a moving path of the supporter 68, supporting the supporter 68 using the circumferential surfaces of the respective rollers, and rotating the rollers in the circumferential direction.

The dew condensation step 33 is a step for forming water droplets by condensing dew on a film surface of the cast film 44. The water droplets can be formed by, for example, cooling the cast film 44 through the supporter 68 so that the temperature of the cast film reaches a temperature lower than the temperature of an ambient atmosphere. However, it is preferable to supply a humidified gas (for example, air) onto the cast film 44 while adjusting the temperature of the supporter 68 so that the supporter 68 is held at a predetermined temperature since, then, a plurality of water droplets are generated at similar points in time or water droplets are formed in a uniform size.

The evaporation step 34 is a step for evaporating the water droplets formed in the dew condensation step 33 and the solvent 43. In this evaporation step 34, the solvent 43 is evaporated earlier than the water droplets by, for example, supplying a dried gas (for example, air). In such a case, the water droplets are incorporated into the cast film 44, and the pores 26 are formed using the incorporated water droplets as casting molds. Therefore, as the solvent 43, a substance having a faster evaporation rate than water is preferably used, and, in the present embodiment, chloroform is used. However, the water droplets do not necessarily need to begin to evaporate after the solvent 43 is fully evaporated. In addition, as long as the formed pores 26 are maintained, a portion of the solvent 43 may remain in the cast film 44 even after the water droplets are fully evaporated, and, in this case, the remaining solvent 43 is evaporated after the water droplets are fully evaporated. Meanwhile, there is another case in which the water droplets begin to be incorporated into the cast film 44 during the dew condensation step 33. This evaporation step 34 produces the honeycomb structure film 25 on the supporter 68. Meanwhile, in this example, the surface of the honeycomb structure film 25 in contact with the supporter 68 is the second film surface 25b, and the exposed surface serves as the first film surface 25a. The dew condensation step 33 and the evaporation step 34 are steps of the dew condensation method which is well known as a method for producing the honeycomb structure film 25. In addition, in a case in which the cast film 44 is formed to be long, the dew condensation step 33 and the evaporation step 34 can be carried out using a method in which the supporter 68 on which the cast film 44 is formed is conveyed in the longitudinal direction and is sequentially passed through a humidifying zone in which a humidified gas is supplied and a drying zone in which a dried gas is supplied, whereby a long film can be obtained as a honeycomb structure body. Meanwhile, in this example, the honeycomb structure film 25 is produced using the dew condensation method, but the method for producing the honeycomb structure film is not limited to this method, and a honeycomb structure film having a honeycomb structure on a surface may be produced using, for example, a well-known nanoimprint method.

The alcohol contact step 35 is a step for improving wettability which improves the wettability of the honeycomb structure film 25 to water. In the ultrasonic treatment step 36 in the present embodiment, the honeycomb structure film 25 is ultrasonically vibrated in water, and there is a case in which water is not easily allowed to be incorporated into the pores 26 since the first film surface 25a of the honeycomb structure film 25 has low wettability to water depending on the kind of the hydrophobic polymer 42, the diameter $\phi 26$ of the surface opening portion 26a, the interval D26 between the pores 26, or the like. In the alcohol contact step 35, an alcohol is brought into contact with the honeycomb structure film 25, thereby improving wettability to water. In such a case, water is more reliably incorporated into the pores 26 in the ultrasonic treatment step 36. As a result, the supporter is more reliably peeled off from the honeycomb structure film 25, and furthermore, the supporter is uniformly peeled off from the honeycomb structure film 25. In addition, the duration of the ultrasonic treatment is further shortened. The honeycomb structure film 25 with which an alcohol has been brought into contact is preferably subjected to the ultrasonic treatment step 36 before the alcohol is fully evaporated, that is, while the alcohol remains, and more preferably while the honeycomb structure film is wetted with the alcohol. Meanwhile, the improvement of the wettability to water means an increase in the contact angle of water.

As described above, an alcohol is brought into contact with the honeycomb structure film in order to improve the wettability of the honeycomb structure film 25 to water in a case in which water is used in the ultrasonic treatment step 36. Therefore, in a case in which, for example, an alcohol is used in place of water in the ultrasonic treatment step 36, the alcohol contact step 35 is included in the ultrasonic treatment step 36. In this case, in the alcohol contact step 35, the alcohol used for the ultrasonic treatment does two actions of an action of improving the wettability of the honeycomb structure film 25 and an action of transferring ultrasonic vibrations.

The alcohol used in the alcohol contact step 35 may be selected depending on the kind of the hydrophobic polymer 42 and is not particularly limited. However, the alcohol preferably dissolves the hydrophobic polymer 42 as little as possible and preferably has a solubility of the hydrophobic polymer 42 of approximately 0.1 g/100 g or lower. The unit of the solubility "g/100 g" means the mass of the hydrophobic polymer 42 dissolved in 100 g of the alcohol. In addition, the solubility refers to a solubility at the temperature of the alcohol to be brought into contact, and, in the present embodiment, the temperature is room temperature (a temperature in a range of 15° C. to 30° C.). In a case in which the hydrophobic polymer 42 is polystyrene, the alcohol is preferably ethanol, 1-propanol, 2-propanol, or the like, and the alcohol may be singly used, or a mixture of two or more alcohols may be used. Meanwhile, even in a case in which polylactic acid, polycaprolatone, polyglycolic acid, polydioxanone, polyhydroxybutyrate, polybutadiene, polyurethane, poly methyl methacrylate, polycarbonate, a copolymer having a repeating unit thereof, or the like is used as the hydrophobic polymer 42, the alcohol is, similarly, preferably ethanol, 1-propanol, 2-propanol, or the like, and the alcohol may be singly used, or a mixture of two or more alcohols may be used. In the present embodiment, polystyrene is used as the hydrophobic polymer 42 as described above, and ethanol is used as the alcohol.

In the present embodiment, an alcohol is brought into contact with the honeycomb structure film using a method in which the honeycomb structure film 25 is immersed in an alcohol stored in a container (not illustrated) in a state of being superimposed on the supporter 68, but the method is not limited thereto. For example, a method in which, in place of or in addition to immersion, an alcohol is applied to the first film surface 25a of the honeycomb structure film 25, a method in which an alcohol is blown in a liquid droplet form or a mist form, or the like may be used. In a case in which the honeycomb structure film 25 which is a long film is subjected to the alcohol contact step 35, an alcohol may be brought into contact with the honeycomb structure film by conveying the supporter 68 on which the honeycomb structure film 25 is formed in the longitudinal direction and passing the supporter through the alcohol in the container so as to immerse the honeycomb structure film or applying or blowing the alcohol to the first film surface 25a of the honeycomb structure film 25 being conveyed.

The ultrasonic treatment step 36 is a step for producing the pillar structure film 20 by ultrasonically vibrating the honeycomb structure film 25. In this ultrasonic treatment step 36, for example, an ultrasonic treatment device 60 described below (refer to FIG. 8) is used, and the detail of the ultrasonic treatment will be described below.

Figure 2:
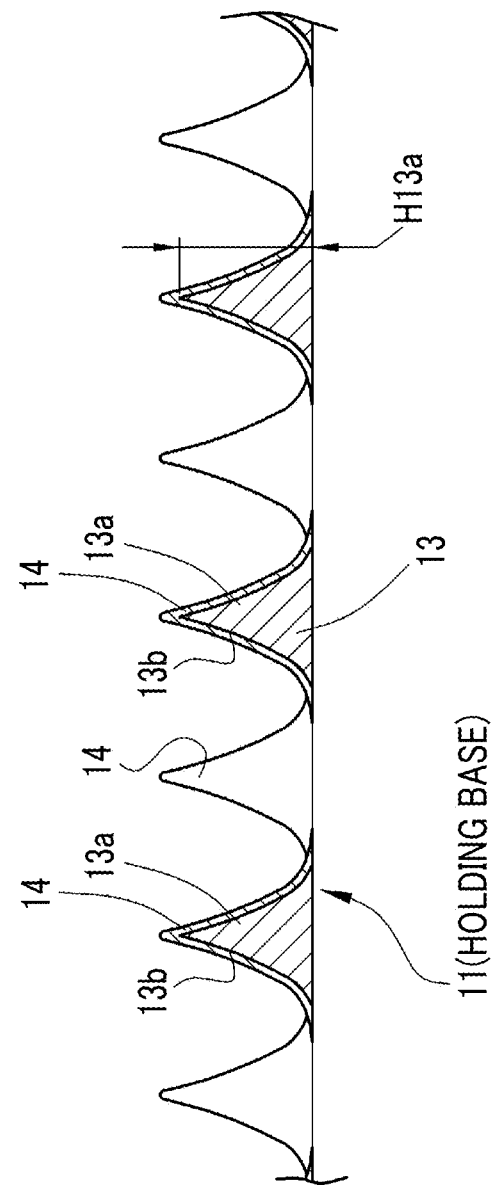
FIG. 2 is a sectional view of a base of a lubricant-holding film.

The fluorine-containing portion formation step 37 is a step for producing the holding base 11 by forming the fluorine-containing portions 14 (refer to FIG. 1). In the fluorine-containing portion formation step 37, the fluorine-containing portions 14 are formed on the outer surfaces 21a (refer to FIG. 3) of the pillars 21 in the pillar structure film 20. In the present embodiment, perfluoroethylene is supplied by means of vacuum deposition, thereby forming the fluorine-containing portions 14. Meanwhile, a method for forming the fluorine-containing portions 14 is not limited to this method, and other methods will be described in other embodiments.

The loading step 38 is a step for producing the slippery film 10 by providing the lubricant 12 to the holding base 11. In the loading step 38, the lubricant 12 is supplied to a surface of the holding base 11 on which the pillar portions 13a are formed, and the lubricant 12 is loaded in regions surrounded by a plurality of the pillar portions 13a. As a method for loading the lubricant 12, in the present embodiment, spin coating (the rotation rate is 1000 rotations/minute) is employed, but the loading method is not limited thereto. Examples of another method include die coating or the like. In the case of a continuous method in which the lubricant is continuously loaded into the long holding base 11, examples thereof include a method in which the holding base 11 is conveyed using a plurality of rollers rotating in the circumferential direction in a state in which the side of the holding base opposite to the side on which the pillar portions 13a are formed is placed to face downwards, and the lubricant 12 is continuously applied from above using, for example, a spin coater.

The peeling step 39 is a step for peeling the slippery film 10 off from the supporter 68. Meanwhile, there is another case in which the peeling step 39 is not provided depending on an aspect of the storage or use of the slippery film 10. For example, in a case in which the slippery film is used as a film-shaped antifouling material, the peeling step 39 is not provided, and the slippery film 10 is stored in a state of being superimposed on the supporter 68 and is provided for use. In addition, in the present embodiment, the peeling step 39 is provided to peel the slippery film 10 off from the supporter 68, but is not limited thereto. For example, the peeling step may be provided to peel the pillar structure film 20 off from the supporter 68 after the ultrasonic treatment step and before the fluorine-containing portion formation step or the peeling step may be provided to peel the holding base 11 off from the supporter 68 after the fluorine-containing portion formation step and before the loading step.

The ultrasonic treatment device 60 is used in the ultrasonic treatment step 36 and, as illustrated in FIG. 6, includes a device main body 61 and a holding unit 62. The device main body 61 is made up of a liquid vessel 65 for containing liquid, an ultrasonic vibrator (not illustrated), an ultrasonic oscillator (not illustrated), and the like. In the present embodiment, as liquid contained in the liquid vessel 65, water 63 is used. In the present embodiment, the ultrasonic vibrator is made up of a plurality of ultrasonic vibrators (not illustrated) provided in a side portion and a bottom portion of the liquid vessel 65, but the ultrasonic vibrator is not limited thereto. For example, the ultrasonic vibrator may be a so-called embedded vibrator which is used in a state of being embedded in a liquid vessel or a vibration plate in which a vibrator attached to a hole in the bottom portion of a liquid vessel including the hole open in the bottom portion is disposed on a plate. An ultrasonic vibration element converts high-frequency electric energy generated from the ultrasonic oscillator to mechanical vibration energy, thereby generating sonic waves. As the above-described device main body 61, a commercially available ultrasonic washer may be used, and, in the present embodiment, an AU-308CB manufactured by AIWA Medical Industry Co., Ltd. is used.

The holding unit 62 is made up of a clip 66, a moving mechanism 67, and the like. The clip 66 is provided to hold the honeycomb structure film 25, and, in the present embodiment, sandwiches the honeycomb structure film 25 superimposed on the supporter 68 together with the supporter 68. The clip 66 includes a sandwiching member 66a for sandwiching the honeycomb structure film 25 and the supporter 68 and a clip main body 66b for controlling sandwiching and releasing by means of the sandwiching member 66a. The clip main body 66b is connected to the moving mechanism 67, and the moving mechanism 67 moves the clip main body 66b in the vertical direction, that is, up and down. Due to the moving mechanism, the honeycomb structure film 25 sandwiched using the sandwiching member 66a and the supporter 68 is moved in the vertical direction. Meanwhile, a holding member is not limited to the clip 66 as long as the holding member is capable of holding the honeycomb structure film 25, and, for example, a frame-like holding member or the like capable of holding the periphery of the honeycomb structure film 25 may be used.

The liquid contained in the liquid vessel 65 is not limited to water, but a liquid that dissolves the hydrophobic polymer 42 (refer to FIG. 7) as little as possible or a liquid that does not swell the honeycomb structure film 25 is preferred. A liquid that dissolves the hydrophobic polymer as little as possible is preferably an alcohol having a solubility of the hydrophobic polymer 42 of approximately 0.1 g/100 g or lower. The unit of the solubility "g/100 g" means the mass of the hydrophobic polymer 42 dissolved in 100 g of the liquid contained in the liquid vessel 65. The solubility refers to a solubility at the temperature during the ultrasonic treatment, and, in the present embodiment, the temperature is room temperature (a temperature in a range of 15° C. to 30° C.). As a preferred example of a liquid other than water, in a case in which the hydrophobic polymer 42 is polystyrene, the liquid is preferably ethanol, 1-propanol, butanol, or the like, and the liquid may be singly used, or a mixture of two or more liquids may be used. In a case in which the hydrophobic polymer 42 is polybutadiene, the liquid is preferably ethanol, 1-propanol, acetone, or the like, and the liquid may be singly used, or a mixture of two or more liquids may be used.

The treatment duration during which the honeycomb structure film 25 is ultrasonically vibrated is set to 10 minutes in the present embodiment. However, the treatment duration may be set in consideration of the thickness of the partition wall 27, the presence or absence of the partition wall opening portion 27a, the kind of the hydrophobic polymer 42, and the like, is not limited to 10 minutes, and is preferably, for example, in a range of 10 seconds to 60 minutes, more preferably in a range of 1 minute to 30 minutes, and still more preferably in a range of 1 minute to 10 minutes. In addition, as the oscillation output increases, the treatment can be carried out within a shorter period of time. In a case in which the oscillation output is small, the treatment duration needs to be set to be long. Meanwhile, as the specific gravity of the liquid contained in the liquid vessel 65 increases, it becomes more difficult to transfer ultraviolet vibrations, and thus it is necessary to set the treatment duration to be longer and set the oscillation output to be greater.

The action of the ultrasonic treatment device 60 is as described below. The honeycomb structure film 25 is sandwiched using the sandwiching member 66a in a state of being superimposed on the supporter 68. The clip 66 is moved down using the moving mechanism 67 in a state in which the honeycomb structure film 25 and the supporter 68 are sandwiched using the sandwiching member 66a, and thereby moving the honeycomb structure film 25 to a treatment position below the water surface. Electric energy from the ultrasonic oscillator is converted to mechanical vibration energy using the ultrasonic vibrator, and the vibration energy is imparted to the honeycomb structure film 25 through water in the liquid vessel 65. The honeycomb structure film 25 is imparted with ultrasonic vibrations in the water 63 in the above-described manner.

Figure 9:
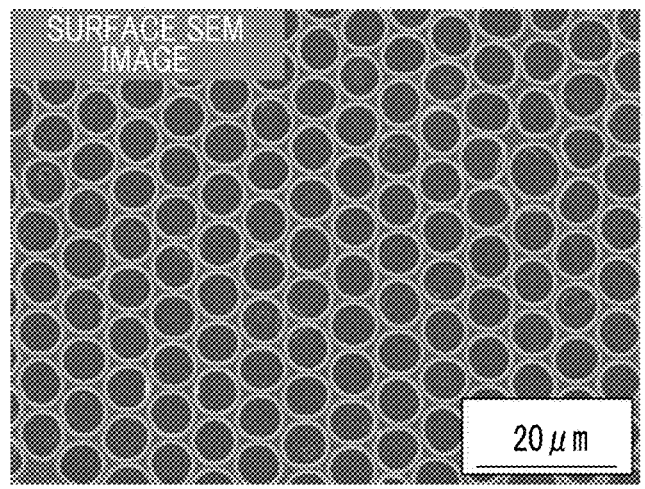
FIG. 9 is an electron microscopic picture of the honeycomb structure film seen in a direction perpendicular to one surface.
Figure 10A:
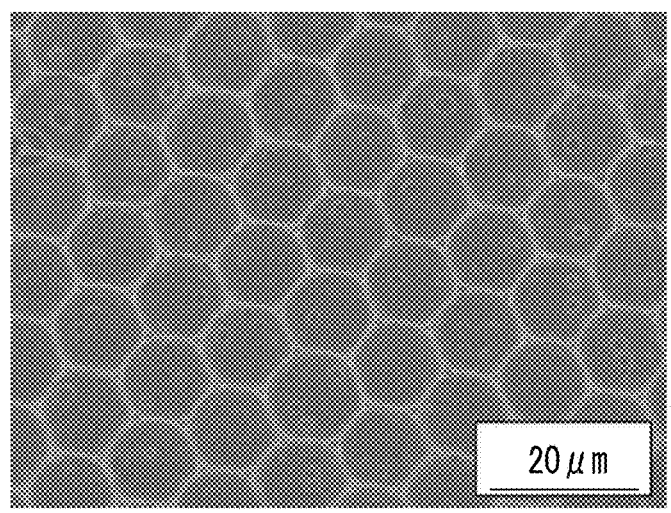
FIG. 10A is an electron microscopic picture of the pillar structure film seen in a direction perpendicular to one film surface.
Figure 10B:
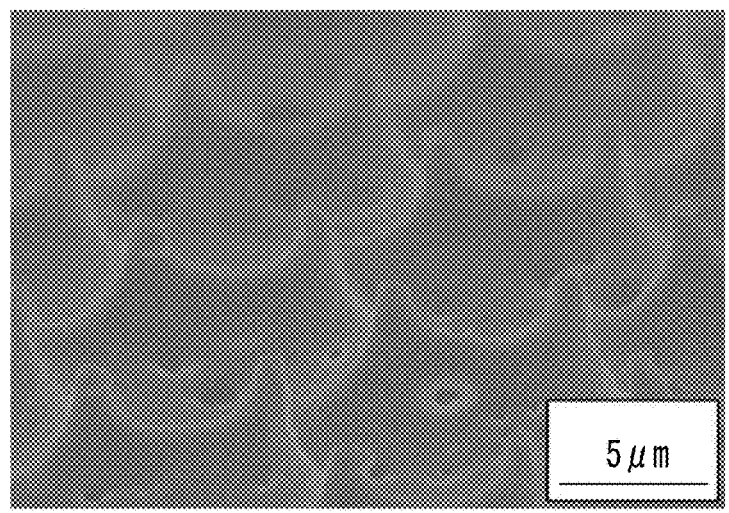
FIG. 10B is an electron microscopic picture of the pillar structure film seen in a direction orthogonal to one film surface and a direction perpendicular to the film surface.

When ultrasonic vibrations are imparted in the water 63, a brittle portion in the honeycomb structure film 25, that is, a part of the partition wall 27 approximately in the first film surface 25a side from the center thereof in which the partition wall opening portion 27a having the smallest thickness in the thickness direction of the honeycomb structure film 25 is formed is broken and peeled off from the honeycomb structure film 25. The second film surface 25b side of the honeycomb structure film 25 is in a state in which the entire surface is attached to and supported by the supporter 68, and thus the form of the second film surface side is reliably maintained even when ultrasonic vibrations are imparted. In such a case, a part of the partition wall 27 in the second film surface 25b side remains as the pillar 21, and the honeycomb structure film 25 (FIG. 9) turns into the pillar structure film 20 (FIGS. 10A and 10B). In addition, since the alcohol contact step 35 improves the wettability of the first film surface 25a of the honeycomb structure film 25 to water, the water 63 is reliably incorporated into all the pores 26, and thus ultrasonic vibrations are more reliably and equally imparted to all the partition walls 27. As a result, a uniform pillar structure film 20 is obtained.

In a case in which a long honeycomb structure film 25 is subjected to the ultrasonic treatment step 36, ultrasonic vibrations may be imparted by conveying the supporter 68 on which the honeycomb structure film 25 is formed in the longitudinal direction and passing the supporter through the water in the liquid vessel 65 so as to immerse the supporter in the water. Meanwhile, in a case in which the liquid vessel 65 contains an alcohol, the honeycomb structure film is brought into contact with the alcohol and is subjected to the ultrasonic treatment in the liquid vessel 65.

In this example, the honeycomb structure film 25 is imparted with ultrasonic vibrations in a state of being supported by the supporter 68; however, in a case in which the second film surface 25b side of the honeycomb structure film 25 is strong enough to withstand the stress of the ultrasonic vibrations, the honeycomb structure film 25 may be imparted with ultrasonic vibrations in a state of being peeled off from the supporter 68.

After the first film surface 25a side is peeled off, the clip 66 is moved up using the moving mechanism 67 so as to move the pillar structure film 20 to a shelter position on the water surface. The sandwiching of the pillar structure film 20 and the supporter 68 by means of the sandwiching member 66a is released, and the pillar structure film 20 is dried in a state of being supported by the supporter 68. The pillar structure film can be dried using a well-known drying method in which, for example, a dried gas (for example, air) is blown. Meanwhile, in this example, the pillar structure film 20 is dried after the sandwiching by means of the sandwiching member 66a is released, but the pillar structure film 20 may be dried in a state of being sandwiched. In addition, the pillar structure film 20 may be dried after being peeled off from the supporter 68 in the peeling step 39, but the pillar structure film is more preferably dried in a state of being supported by the supporter 68 since deformation of the pillar structure film 20 is suppressed.

In the present embodiment, the supporter 68 used in the ultrasonic treatment step 36 is also used in the casting step 32, but the supporter is not limited thereto. For example, it is also possible to peel the honeycomb structure film 25 off from the supporter used in the casting step 32 after the evaporation step 34, attach the honeycomb structure film 25 to another supporter using an adhesive, adhesive tape, or the like before the alcohol contact step 35, and subject the honeycomb structure film 25 to the alcohol contact step 35 and the ultrasonic treatment step 36 in a state of being attached to the new supporter. In this case, as the supporter, a supporter formed of a material that dissolves in the alcohol used in the alcohol contact step 35 and the liquid used in the ultrasonic treatment step 36 as little as possible is used.

As another method for producing the pillar structure film 20 using the honeycomb structure film 25, there is peeling by means of adhesive tape, and this method may be used. Specifically, adhesive tape is attached to the first film surface 25a of the honeycomb structure film 25, and the adhesive tape is drawn so as to be peeled off from the honeycomb structure film 25, thereby peeling a part in the first film surface 25a side. However, according to the ultrasonic treatment of the present embodiment, the pillar structure film 20 having a larger size than that produced using the peeling method of the related art by means of adhesive tape is easily produced, which is preferable. In addition, in a case in which the supporter 68 and the honeycomb structure film 25 are flexible, for example, the supporter and the honeycomb structure film may be immersed in the water 63 in the liquid vessel 65 in a state of being wound in a tubular manner or bent, and, in such a case, the pillar structure film 20 having a larger area is produced. In addition, even when the first film surface 25a is curved like the case of the honeycomb structure film 25 in a wound state or a bent state, the pillar structure film 20 is reliably produced. Therefore, for example, when the honeycomb structure film 25 is formed on an inner wall or an outer wall of a glass tube, and the glass tube on which the honeycomb structure film 25 is formed is immersed in the water 63 in the liquid vessel 65, the pillar structure film 20 is formed on the inner wall or the outer wall of the glass tube. Meanwhile, even in this case, the alcohol contact treatment is more preferably carried out before the ultrasonic treatment step since, then, the wettability to water of the first film surface 25a of the honeycomb structure film 25 formed on the inner wall or the outer wall is improved. Regarding the alcohol contact step 35, even in a case in which the honeycomb structure film 25 is formed on an inner wall of an extremely narrow tube having, for example, an outer diameter of 1 mm and an inner diameter of 0.7 mm, wettability to water is reliably improved by immersing the tube in the alcohol, and the pillar structure film 20 is uniformly and easily formed on the inner wall of the tube. When the fluorine-containing portion formation step and the loading step are carried out on the pillar structure film 20 formed on the inner wall of the tube, it is possible to form the slippery film 10 on the inner wall of the tube.

Second Embodiment

Regarding the ultrasonic treatment, as the modulus of elasticity of the honeycomb structure film 25 decreases, that is, the honeycomb structure film becomes more flexible, the above-described peeling action becomes weaker. In such a case, it is preferable to carry out a hardening treatment in order to further harden the honeycomb structure film 25 and then subject the honeycomb structure film in a hardened state to the ultrasonic treatment. The modulus of elasticity of the honeycomb structure film 20 can be measured using Japanese Industrial Standards JIS K 7127 (title: Plastics-Determination of tensile properties—Part 3: Test conditions for films and sheets). The modulus of elasticity of the honeycomb structure film 20 is preferably set to 1 GPa or higher by means of the hardening treatment. In the present embodiment, as the hardening treatment, a cooling treatment for cooling the honeycomb structure film 25 is carried out. In a case in which the cooling treatment is carried out, the ultrasonic treatment may be carried out by, for example, putting water and ice into the liquid vessel 65 and immersing the honeycomb structure film 25 in the liquid vessel 65. Then, the temperature of the honeycomb structure film 25 decreases, and ultrasonic vibrations are imparted in a state in which the honeycomb structure film becomes harder, that is, the modulus of elasticity becomes higher, and the first film surface 25a side is more reliably peeled off. Water and ice put into the liquid vessel 65 in the cooling treatment are not particularly limited, and, for example, liquid nitrogen or the like may be used.

The cooling treatment is preferably carried out on the honeycomb structure film 25 under the ultrasonic treatment step 36. The cooling treatment is particularly effective in a case in which, for example, polybutadiene, polylactic acid, or the like is used as the hydrophobic polymer 42, and, in the present embodiment, polybutadiene, which is a material that is more flexible than polystyrene used in the first embodiment, is used. In a case in which the hydrophobic polymer 42 used to form the honeycomb structure film 25 has a glass transition temperature, it is more preferable to cool the honeycomb structure film 25 to the glass transition temperature or lower in the cooling treatment.

Third Embodiment

Another example of the hardening treatment is a light hardening treatment. The light hardening treatment is effective in a case in which a so-called light polymerizable compound that is polymerized by applying light is used in place of or in addition to the hydrophobic polymer 42. The light polymerizable compound may be any one of a polymer, an oligomer, or a mixture of a polymer and an oligomer. In addition, crosslinking can be considered as the polymerization.

Figure 11:
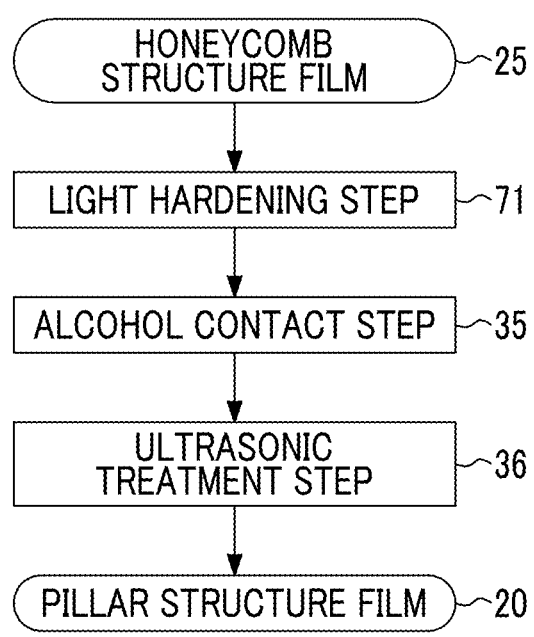
FIG. 11 is an explanatory view illustrating another step of producing the pillar structure film.

As an example of the light hardening treatment, in the present embodiment, the honeycomb structure film 25 is subjected to a light hardening step 71, the alcohol contact step 35, and the ultrasonic treatment step 36 in this order as illustrated in FIG. 11. However, as described above, there is a case in which the alcohol contact step 35 is not provided, and there is a case in which the alcohol contact step 35 is included in the ultrasonic treatment step 36. As described above, the light hardening step 71 needs to be provided ahead of the ultrasonic treatment step 36. The light hardening step 71 is a step for carrying out the light hardening treatment, and, in this step, a light polymerizable compound is polymerized by applying light, which polymerizes the light polymerizable compound, to the honeycomb structure film 25 including the light polymerizable compound, and thus the honeycomb structure film 25 is further hardened. In the present embodiment, as the hydrophobic polymer 42, polybutadiene (manufactured by JSR Corporation, syndiotactic 1,2-polybutadiene, RB820), which is crosslinked by applying ultraviolet rays, is used, and the honeycomb structure film 25 is made of this hydrophobic polymer 42.

In the light hardening treatment in the present embodiment, the honeycomb structure film 25 is irradiated with ultraviolet rays using a light source (not illustrated) emitting ultraviolet rays. The light source is disposed on the first film surface 25a side of the honeycomb structure film 25 and radiates ultraviolet rays toward the first film surface 25a. However, the light source may be disposed on the second film surface 25b side in place of or in addition to the first film surface 25a side depending on the presence or absence and degree of light transmittance of a material constituting the honeycomb structure film 25. The ultraviolet radiation duration is set to 10 minutes in the present embodiment, but is not limited thereto, and is preferably in a range of approximately 1 minute to 60 minutes.

Radiated ultraviolet rays crosslink the hydrophobic polymer 42 of this example, and the honeycomb structure film 25 is hardened. The honeycomb structure film 25 that has undergone this light hardening step 71 is subjected to the alcohol contact step 35 and then the ultrasonic treatment step 36. Since the honeycomb structure film 25 has been further hardened in the light hardening step 71, compared with a case in which the light hardening treatment is not carried out, the first film surface 25a side of the honeycomb structure film 25 is more reliably peeled off, and a pillar structure film 20 having a more uniform structure is obtained. Meanwhile, in the present embodiment as well, similar to the first embodiment, the duration of the ultrasonic treatment is set to 10 minutes.

In the second embodiment and the third embodiment, the fluorine-containing portion formation step 37 is a step in which an ene-thiol reaction is performed and a step for a so-called fluorination treatment. This is because, as the hydrophobic polymer, polybutadiene is used, and thus an ene-thiol reaction with a thiol containing fluorine is possible. Therefore, in a case in which a compound containing fluorine and a polyolefin capable of an ene-thiol reaction are used as the hydrophobic polymer 42 (refer to FIG. 7) in place of polybutadiene, the above-described method is effective. When an ene-thiol reaction is used, the fluorine-containing portions 14 are formed in an extremely small thickness, and thus regions surrounded by a plurality of the pillar portions 13a are more reliably formed on the holding base 11. The thickness of the fluorine-containing portion 14 in the second embodiment and the third embodiment is much smaller than that in the first embodiment and is a molecule-level thickness.

In the present embodiment, the fluorine-containing portion formation step 37 in which an ene-thiol reaction is performed is carried out as described below. First, the pillar structure film 20 is immersed in a solution in which a compound including fluorine (hereinafter, referred to as the fluorine-containing compound) is dissolved. During this immersion, that is, during an ene-thiol reaction, the solution is preferably placed under nitrogen (N2). In addition, during the immersion, the solution is preferably maintained at a temperature in a range of 50° C. to 60° C. and is maintained at 55° C. in the present embodiment. A change in the temperature of the solution is dependent on the cleavage temperature of a radical initiator, and the upper limit thereof is dependent on a thiol chemical (the fluorine-containing compound) and the boiling point of the solution. As a solvent for the fluorine-containing compound, an alcohol is used. As the fluorine-containing compound, 1H,1H,2H,2H-perfluorooctanethiol (PFOT) is used, but the fluorine-containing compound is not limited thereto, and additional examples thereof include 1H, 1H,2H,2H-perfluorodecanethiol (PFDT), 1H,1H,2H,2H-perfluorohexanethiol (PFHT), or the like. The concentration of the fluorine-containing compound in the solution is preferably in a range of 3 g/liter to 300 g/liter and is set to 30 g/liter in the present embodiment.

To the solution, 2,2'-azobis(2,4-dimethylvaleronitrile) (ADV) is added as the radical initiator. The concentration of the radical initiator in the solution is preferably in a range of 0.03 g/liter to 3.0 g/liter and is set to 0.3 g/L in the present embodiment.

The pillar structure film 20 is left to stand in a state of being immersed in the solution. The duration during which the pillar structure film is left to stand is set to 10 hours in the present embodiment, but is not limited thereto, and is preferably in a range of 5 hours to 25 hours. While the pillar structure film is left to stand in this atmosphere, the ene-thiol reaction progresses, and polybutadiene is fluorinated, thereby forming the fluorine-containing portions 14. The fluorine-containing portion 14 has the following structure.

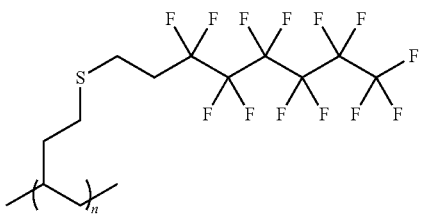

After being placed under a nitrogen atmosphere, the obtained holding base 11 is preferably washed. In the present embodiment, the holding base is washed with ethanol, but any substance, for example, 1-propanol or 2-propanol, may be used as long as the substance does not dissolve or swell the holding base 11.

Figure 12:
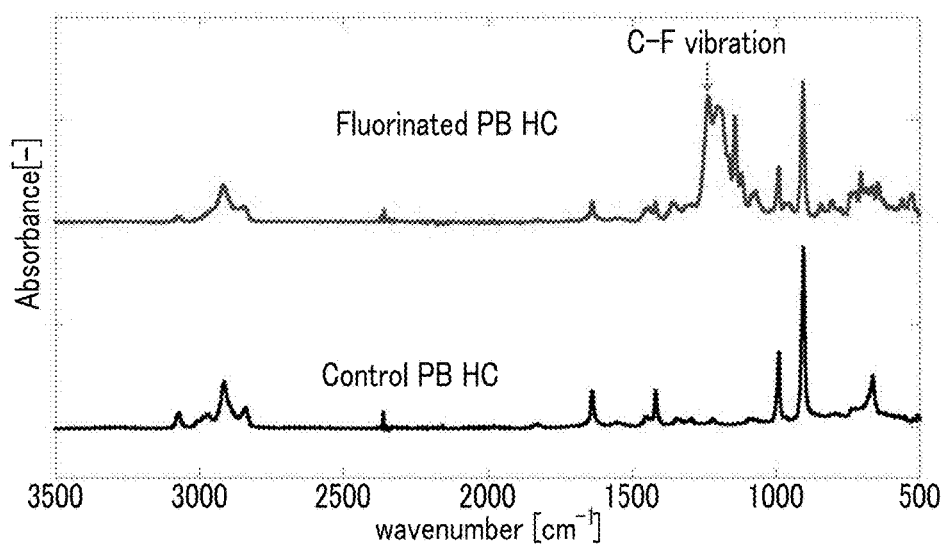
FIG. 12 is a spectrum chart of Fourier transform infrared spectroscopy (FT-IR) before and after an ene-thiol reaction of the pillar structure film.

Whether or not the fluorine-containing portions 14 are formed can be confirmed using, for example, a spectrum chart of Fourier transform infrared spectroscopy (FT-IR). In the present embodiment, an FT-IR6100 manufactured by JASCO Corporation is used, a spectrum is obtained using attenuated total reflection (ATR), and formation of the fluorine-containing portions 14 is confirmed. As illustrated in FIG. 12, a spectrum corresponding to a C—F skeleton vibration is confirmed only after the fluorination treatment at near approximately 1200 cm$^{-1}$, and thus the fluorine-containing portions 14 are formed.

In a case in which the fluorine-containing portions 14 are formed by means of the ene-thiol reaction, and an amphipathic compound is added to the solution 41, it is more preferable to remove the amphipathic compound from the surface before the initiation of the ene-thiol reaction. For the removal of the amphipathic compound, there is a method in which the amphipathic compound is washed with an alcohol using a method of immersing the pillar structure film 20 in the alcohol or of blowing the alcohol to the pillar structure film 20, and, in the present embodiment, the pillar structure film is immersed in 1-propanol as the alcohol. As the alcohol, it is possible to use 1-propanol, 2-propanol, ethanol, methanol, or a mixture of two or more thereof. The immersion duration is preferably set to at least 30 seconds and more preferably set in a range of 30 seconds to 24 hours. In such a case, the amphipathic compound on the outer surfaces of the pillars 21 in the pillar structure film 20 is removed, and the ene-thiol reaction more rapidly and reliably ends.

In the second embodiment and the third embodiment, the fluorine-containing portions 14 are formed after the ultrasonic treatment; however, instead, the ultrasonic treatment may be carried out after the fluorine-containing portions 14 are formed. That is, the holding base 11 is obtained by being peeled off from the honeycomb structure film 25 which has undergone the fluorine-containing portion formation step 37.

Fourth Embodiment

Figure 13:
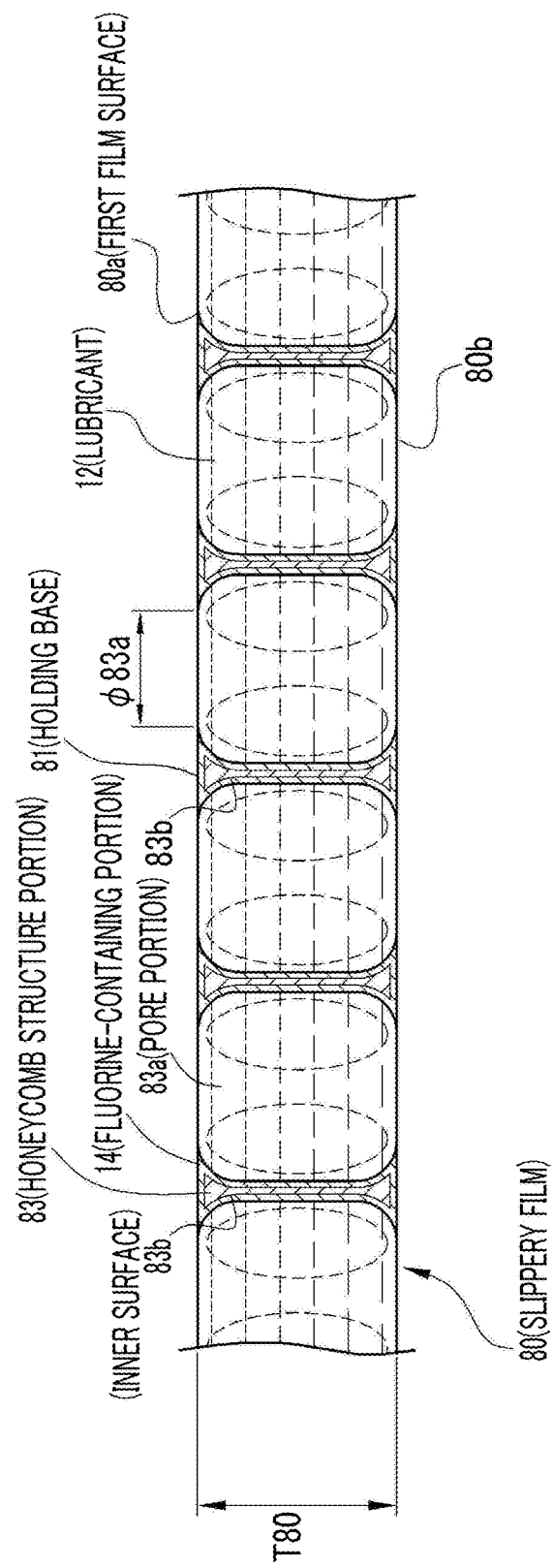
FIG. 13 is a sectional view of the slippery film.

The slippery film includes the holding base 11 including the pillar structure portions 13 and is not limited to the slippery film 10 obtained using the pillar structure film 20. For example, the slippery film can be obtained using the honeycomb structure film 25. In FIG. 13, a slippery film 80 which is an uneven structure body formed in a film shape includes a holding base 81 and the lubricant 12. Meanwhile, in FIG. 13, the same members as in FIG. 1 will be given the same reference signs and will not be described.

The holding base 81 includes honeycomb structure portions 83 and the fluorine-containing portions 14. The honeycomb structure portion 83 is an uneven structure portion including a plurality of pore portions 83a as recess portions. The pore portions 83a are regularly arranged. In this example, the pore portions 83a are open on one surface (hereinafter, referred to as the first film surface) 80a and on the other surface (the second film surface) 80b, but there is another case in which the pore portions are open only on the first film surface 80a. The fluorine-containing portion 14 is formed on an inner circumferential surface 83b of the pore portion 83a. In the present embodiment, the honeycomb structure body 83 is formed of PB (polybutadiene), but may be formed of a different hydrophobic polymer 42. The lubricant 12 is loaded into the pore portions 83a. The thickness T80 of the slippery film 80 is set in a range of 1 μm to 50 μm and is 10 μm in the present embodiment. The depth of the pore portion 83a is in a range of 0.2 μm to 50 μm, and the opening diameter φ83a of the pore portion 83a is in a range of 0.2 μm to 50 μm.

The action of the above-described constitution will be described. In the holding base 81, since a plurality of the pore portions 83a are regularly arranged, and the inner circumferential surface of the pore portion 83a is formed of a material having a C—F bond, the fluorine-based lubricant 12 is held in the pore portions 83a. Since the first film surface 80a is constituted with the top surface of the holding base 81 in FIG. 13 and the lubricant 12, and a majority of the region is constituted with the lubricant 12, the slippery film exhibits a slipping property with respect to liquid or gas in contact with the slippery film. Even when the static contact angle of the first film surface 80a with respect to liquid or gas in contact with the slippery film is great, the slipping property with respect to liquid or gas is developed. Therefore, liquid or gas remaining on the first film surface 80a is suppressed.

The sliding angle on the first film surface 80a of the slippery film 80 is 3.3° for a water droplet and 5.4° for a tetradecane liquid droplet, and a strong slipping property is exhibited. Therefore, the slippery film does not allow liquid to easily attach thereto and has strong water-repellency and excellent antifouling properties.

In the slippery film 80, the static contact angle of water on the first film surface 80a is in a range of approximately 105° to 115°.

In addition, since the fluorine-containing portion 14 is formed on the inner circumferential surface 83b of the pore portion 83a, the lubricant 12 is reliably held for a longer period of time. Therefore, for example, even when the slippery film 80 is used for a long period of time in an environment in which water is present on or passes through the first film surface 80a, a phenomenon in which the lubricant 12 escapes from the regions surrounded by a plurality of the pore portions 83a and water comes into the regions is suppressed. Therefore, the slipping property is maintained for a long period of time.

Figure 14:
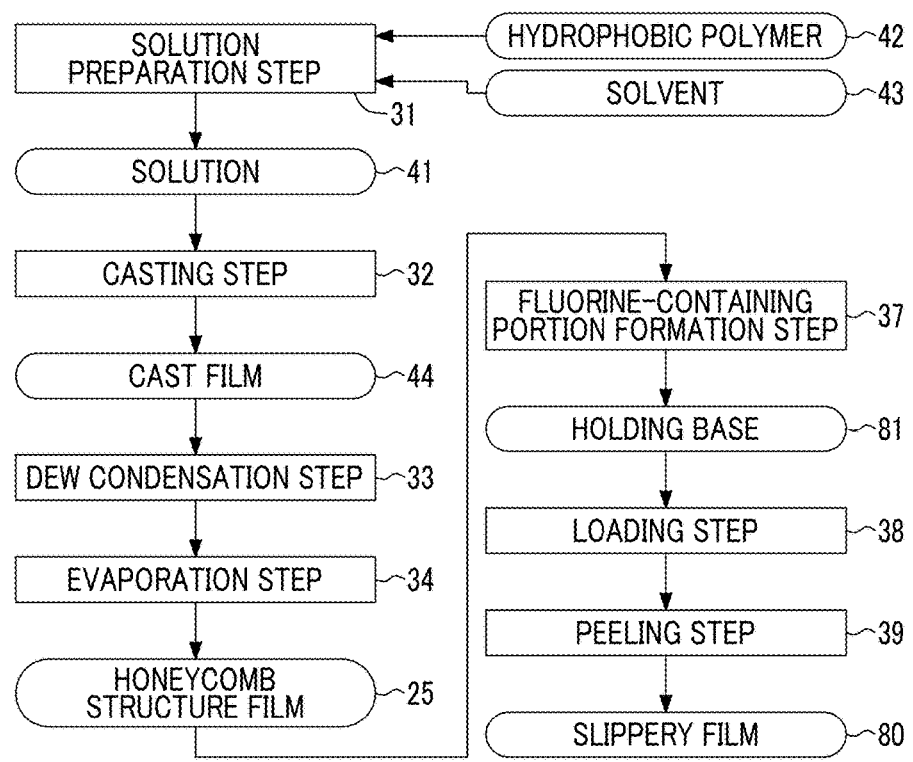
FIG. 14 is an explanatory view illustrating a step of producing the slippery film.

As illustrated in FIG. 14, the slippery film 80 is produced by subjecting the honeycomb structure film 25 to the fluorine-containing portion formation step 37, the loading step 38, and the peeling step 39 in this order. In the fluorine-containing portion formation step 37, the fluorine-containing portions 14 are formed on the inner surfaces of the pores 26 in the honeycomb structure film 25, thereby producing the holding base 81, and, in this example, the fluorine-containing portions 14 are formed by means of an ene-thiol reaction. In a case in which an amphipathic compound is added to the solution 41, it is preferable to remove the amphipathic compound from the honeycomb structure film 25 before the fluorine-containing portion formation step 37.

The slippery material to be produced is not limited to a film-shaped material as described above. For example, the slippery material may be, for example, a block-shaped material having a much larger thickness than the slippery films 10 and 80. When a block-shaped pillar structure body including pillars on the surface or a honeycomb structure including pores is used as the material, a block-shaped slippery material is produced. As an example, a block-shaped honeycomb structure body (not illustrated) including a honeycomb structure, in which water droplets generated on the liquid surface of the solution 41 are used as casting molds, formed in a part of the surface of the block can be obtained by feeding the solution 41 into a desired mold and subjecting the solution 41 in the mold to the dew condensation step 33 and the evaporation step 34. When this honeycomb structure body is subjected to the ultrasonic treatment step 36, a block-shaped pillar structure body (not illustrated) is obtained. Even in this case, the above-described alcohol contact treatment and hardening treatment may be carried out.

Fifth Embodiment

Figure 15:
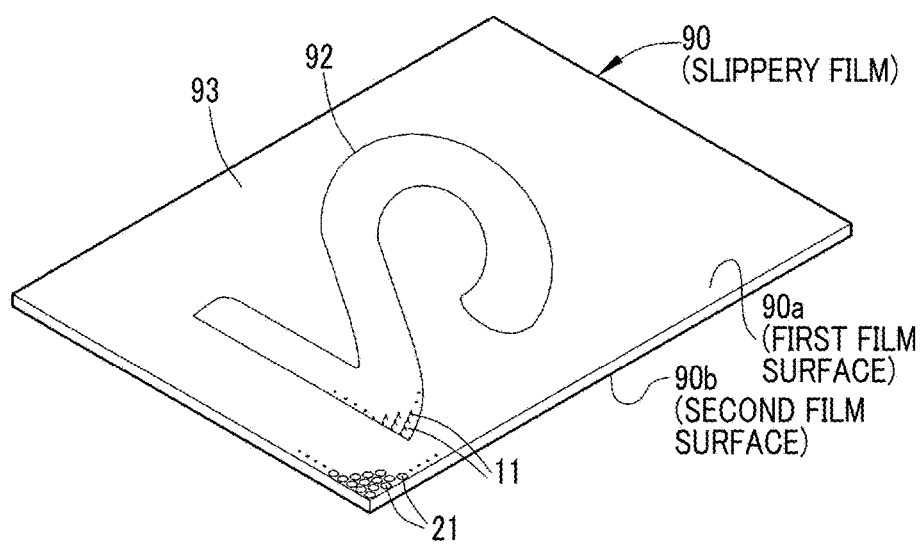
FIG. 15 is a perspective view illustrating the slippery film.

A slippery film 90 is formed in a film shape as illustrated in FIG. 15 and includes a first structure portion 92 and a second structure portion 93. Meanwhile, hereinafter, only members different from those in the slippery film 10 or the slippery film 80 will be described, and substantially the same members will be given the same reference signs as those in FIGS. 1 and 13 and will not be described.

The first structure portion 92 is constituted in the same manner as in the slippery film 10 and is formed in an aspect in which a plurality of the pillar portions 13a are regularly arranged on a first film surface 90a side which is one surface, and the fluorine-containing portion 14 is formed on the outer surface 13b (refer to FIG. 1) of the pillar portion 13a. The lubricant 12 is held in regions surrounded by a plurality of the pillar portions 13a. Meanwhile, in order to avoid complication in the drawing, the lubricant 12 is not illustrated in FIG. 15. The second structure portion 93 is constituted in the same manner as in the slippery film 80 and is formed in an aspect in which a plurality of the pore portions 83a, which penetrate in the thickness direction from the first film surface 90a to a second film surface 90b which is the other surface, are regularly arranged. The fluorine-containing portion 14 is formed on the inner surface (refer to FIG. 13) of the pore portion 83a, and the lubricant 12 is held in the pore portions 83a which are not illustrated. In a holding base for the first structure portion 92 and the second structure portion 93, parts excluding the fluorine-containing portions 14 are constituted with polybutadiene and may include an amphipathic compound.

The first structure portion 92 is formed in an island shape by being surrounded by the second structure portion 93; however, for example, the second structure portion may be formed in an island shape so that the first structure portion surrounds the second structure portion. In addition, in this example, when seen in a direction perpendicular to the first film surface 90a, the first structure portion 92 forms a mirrored image shape of a number "2", but the shape is not limited thereto. For example, when seen in a direction perpendicular to the first film surface 90a, a protrusion structure portion may have a variety of shapes such as a round shape, a rectangular shape, or an irregular shape, and a plurality of protrusion structure portions having equal or different shapes may be isolated and formed in an island shape. The height of the first film surface 90a is lower in the first structure portion 92 than in the second structure portion 93.

When the above-described constitution is employed, the degree of a slipping property varies in the first structure portion 92 and the second structure portion 93 on the first film surface 90a. As described above, when the first structure portion 92 and the second structure portion 93 are produced on the same plane, liquid droplets are pinned in the second structure portion 93 in which the slipping property is weak. Therefore, since the second structure portion 93 is surrounded by the first structure portions 92, it becomes possible to limit the motion of liquid droplets or to control liquid droplets to move only in a patterned direction by patterning the shape of the second structure portion 93 in a linear shape. When a pattern is formed in a place having different slipping properties, it is possible to form, for example, a micro flow path not including any partition walls.

Figure 16:
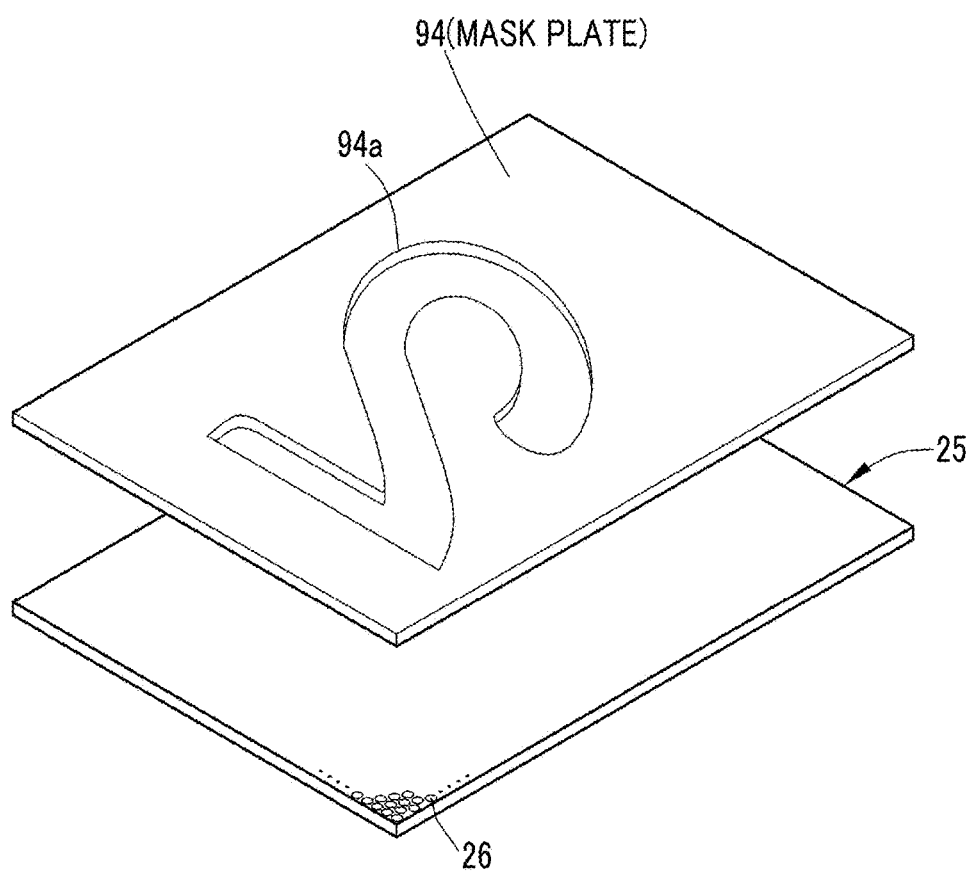
FIG. 16 is a perspective view illustrating a mask plate.

In a case in which the slippery film 90 is produced, the light hardening treatment is carried out in a state in which the mask plate 94 is superimposed on the first film surface 25a of the honeycomb structure film 25 (refer to FIGS. 4 to 6) as illustrated in FIG. 16. In this example, polybutadiene is used as the hydrophobic polymer 42 (refer to FIG. 7). Therefore, similar to the third embodiment, the honeycomb structure film 25 on which the mask plate 94 is superimposed is subjected to the light hardening step 71, then, the mask plate 94 is removed, and the honeycomb structure film is sequentially subjected to the alcohol contact step 35 and the ultrasonic treatment step 36.

The mask plate 94 is, for example, a plate-like member having a size that is equal to or larger than that of the honeycomb structure film 25 and includes an opening 94a in a part corresponding to the first structure portion 92. The mask plate 94 is made of a metal that does not transmit ultraviolet rays and thus prevent a region in the honeycomb structure film 25 covered with the mask plate 94 from being irradiated with ultraviolet rays. A variety of holding bases including a varying number of the first structure portions 92 having a different size, shape, position, or the like can be formed by changing the size, shape, position, number, or the like of the opening 94a in the mask plate 94. Meanwhile, from the viewpoint of clarifying the boundary between the first structure portion 92 and the second structure portion 93, the honeycomb structure film 25 and the mask plate 94 are preferably superimposed on each other in a state of being attached together.

When the honeycomb structure film 25 is irradiated with ultraviolet rays in a state in which the mask plate 94 is superimposed thereon, the hydrophobic polymer 42 in the honeycomb structure film 25 which is exposed through the opening 94a is crosslinked and hardened, and the hydrophobic polymer 42 in the region covered with the mask plate 94 is not crosslinked. In addition, after the light hardening step 71, the mask plate 94 is removed from the honeycomb structure film 25, and an alcohol is continuously brought into contact with the honeycomb structure film. Then, the wettability of the first film surface 25a to water improves.

Next, the honeycomb structure film 25 is ultrasonically vibrated, and then the mask plate 94 is removed. Therefore, in the region exposed through the opening 94a during the irradiation with ultraviolet rays, a part of the partition wall 27 approximately in the first film surface 25a side from the center thereof breaks and peels off from the honeycomb structure film 25, thereby forming the pillar structure body 13 of the first structure portion 92. Since the honeycomb structure film is ultrasonically vibrated in a state in which wettability to water is improved by means of contact with an alcohol, the pillar portions 13a are formed in a state of a uniform size or shape. In contrast, in the region covered with the mask plate 94 during the irradiation with ultraviolet rays, the shape of the honeycomb structure film 25 is maintained, and thus a honeycomb structure portion 83 of the second structure portion 93 is formed. The lubricant 12 is supplied to the obtained holding base, thereby loading the lubricant 12 to regions surrounded by a plurality of the pillar portions 13a and the insides of the pore portions 83a. Therefore, the slippery film 90 is obtained. As described above, in a case in which a light polymerizable compound that is polymerized by means of irradiation with light is used, it is possible to produce a slippery film including the first structure portion and the second structure portion, and the use of the mask plate enables formation of a pattern of the first structure portion and the second structure.

What is claimed is:

1. A method for producing a lubricant-holding base material,
    wherein, with respect to an uneven structure body which is formed of a hydrophobic polymer and in which a plurality of recess portions or a plurality of protrusion portions are regularly arranged and insides of the recess portions or regions surrounded by a plurality of the protrusion portions adjacent to each other serve as spaces for holding a fluorine-based liquid lubricant, fluorine-containing portions are formed on inner surfaces of the recess portions or on outer surfaces of the protrusion portions, and
    a thickness of the fluorine-containing portion is in a range of 5 nm to 5 µm.

2. The method for producing a lubricant-holding base material according to claim 1,
    wherein the uneven structure body is a pillar structure body in which a plurality of the protrusion portions having a tapering shape and a certain size are formed in an upright shape.

3. The method for producing a lubricant-holding base material according to claim 2,
    wherein the pillar structure body is formed by ultrasonically vibrating a honeycomb structure body provided with a honeycomb structure by arranging a plurality of the recess portions having a certain size in parallel on a surface in liquid so as to peel some portions near the surface off from the honeycomb structure body and leaving a portion of partition walls between the recess portions adjacent to each other in the honeycomb structure body as the protrusion portions.

4. The method for producing a lubricant-holding base material according to claim 1,
    wherein the uneven structure body is a honeycomb structure body provided with a honeycomb structure by arranging a plurality of the recess portions having a certain size in parallel.

5. The method for producing a lubricant-holding base material according to claim 1,
    wherein the hydrophobic polymer is a polyolefin capable of an ene-thiol reaction with a thiol having a fluorine atom, and
    the fluorine-containing portions are formed by fluorinating the hydrophobic polymer with the thiol.

6. The method for producing a lubricant-holding base material according to claim 5,
    wherein the polyolefin is polybutadiene.

7. A method for producing a lubricating material comprising:
    a fluorine-containing portion-forming step of, with respect to an uneven structure body which is formed of a hydrophobic polymer and in which a plurality of recess portions or a plurality of protrusion portions are regularly arranged and insides of the recess portions or regions surrounded by a plurality of the protrusion portions adjacent to each other serve as spaces for holding a fluorine-based liquid lubricant, forming fluorine-containing portions on inner surfaces of the recess portions or on outer surfaces of the protrusion portions; and
    a loading step of loading a fluorine-based lubricant into the insides of the recess portions or the regions surrounded by the protrusion portions,
    wherein a thickness of the fluorine-containing portion is in a range of 5 nm to 5 µm.

8. The method for producing a lubricant-holding base material according to claim 1,
    wherein a height of the protrusion portion is in a range of 0.1 µm to 20 µm.

9. The method for producing a lubricant-holding base material according to claim 1,
    wherein a depth of the recess portion is in a range of 0.2 µm to 50 µm, and
    wherein a diameter of an opening in the recess portion is in a range of 0.2 µm to 50 µm.

10. The method for producing a lubricant-holding base material according to claim 1,
    wherein the fluorine-containing portions include at least one selected from the group consisting of polytetrafluoroethylene, perfluoroalkoxy alkanes, and perfluorooctanethiol.

11. The method for producing a lubricant-holding base material according to claim 1,
    wherein the fluorine-based liquid lubricant is perfluoroalkylether.

12. The method for producing a lubricant-holding base material according to claim 1,
    wherein the hydrophobic polymer is polystyrene.

13. The method for producing a lubricant-holding base material according to claim 1,
    wherein a thickness of the lubricant-holding base material is in a range of 0.2 µm to 100 µm.

* * * * *